United States Patent
Ueno et al.

(10) Patent No.: US 10,436,154 B2
(45) Date of Patent: Oct. 8, 2019

(54) CONTROL DEVICE OF INTERNAL-COMBUSTION ENGINE

(71) Applicant: Honda Motor Co., Ltd., Tokyo (JP)

(72) Inventors: Masaki Ueno, Saitama (JP); Noritaka Kimura, Saitama (JP); Kosuke Ihara, Saitama (JP); Yuto Katori, Saitama (JP); Hajime Uto, Saitama (JP); Yosuke Yamada, Saitama (JP); Masashi Hidaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 15/912,572

(22) Filed: Mar. 6, 2018

(65) Prior Publication Data

US 2018/0274499 A1 Sep. 27, 2018

(30) Foreign Application Priority Data

Mar. 21, 2017 (JP) ................................ 2017-055115

(51) Int. Cl.
*F02D 41/00* (2006.01)
*F02M 26/64* (2016.01)
(Continued)

(52) U.S. Cl.
CPC ........... *F02M 26/64* (2016.02); *F02D 41/005* (2013.01); *F02D 41/0072* (2013.01);
(Continued)

(58) Field of Classification Search
CPC ...... F02M 26/64; F02M 26/47; F02D 41/005; F02D 41/0072; F02D 41/0077;
(Continued)

(56) References Cited

U.S. PATENT DOCUMENTS 6,230,697 B1 * 5/2001 Itoyama ................ F02D 9/04
123/568.21

FOREIGN PATENT DOCUMENTS

JP 2011-069262 4/2011
JP 2013108449 6/2013
(Continued)

OTHER PUBLICATIONS

"Office Action of Japan Counterpart Application," dated Aug. 7, 2018, with English translation thereof, pp. p. 1-p. 7.

*Primary Examiner* — Hai H Huynh
(74) *Attorney, Agent, or Firm* — JCIPRNET

(57) ABSTRACT

In a control device of an internal-combustion engine according to the disclosure, an intake throttle valve (25) for adjusting an EGR valve differential pressure (ΔPEGR) is provided, an EGR valve upstream pressure (PEGR0) is estimated by using a target fresh air amount (GAIRCMD) (step 6), a target differential pressure (ΔPEGRCMD) is set to a smaller value as the target fresh air amount (GAIRCMD) becomes smaller (FIG. 5), and a difference between the EGR valve upstream pressure (PEGR0) and the target differential pressure (ΔPEGRCMD) is set as a target valve downstream pressure (P1CMD) (step 7). By using the target fresh air amount (GAIRCMD), the EGR valve upstream pressure (PEGR0), and the target valve downstream pressure (P1CMD), the target EGR valve opening degree (LEGRCMD) is set (step 23), and an EGR valve (43) is controlled based on the target EGR valve opening degree (step 24).

10 Claims, 10 Drawing Sheets

(51) Int. Cl.
    *F02M 26/06*     (2016.01)
    *F02M 26/47*     (2016.01)

(52) U.S. Cl.
    CPC ......... *F02D 41/0077* (2013.01); *F02M 26/06* (2016.02); *F02M 26/47* (2016.02); *F02D 2041/0017* (2013.01); *F02D 2041/0075* (2013.01); *F02D 2200/0406* (2013.01); *F02D 2200/703* (2013.01)

(58) Field of Classification Search
    CPC ....... F02D 2200/703; F02D 2200/0406; F02D 2041/0017; F02D 2041/0075
    USPC ...... 123/399, 568.19, 568.21; 701/103, 108; 73/114.32, 114.33, 114.37, 114.74
    See application file for complete search history.

(56) References Cited

FOREIGN PATENT DOCUMENTS

| | | |
|---|---|---|
| JP | 2015124685 | 7/2015 |
| JP | 2015-183580 | 10/2015 |

\* cited by examiner

CONTROL DEVICE OF INTERNAL-COMBUSTION ENGINE

CROSS-REFERENCE TO RELATED APPLICATION

This application claims the priority benefit of Japan application serial no. 2017-055115, filed on Mar. 21, 2017. The entirety of the above-mentioned patent application is hereby incorporated by reference herein and made a part of this specification.

BACKGROUND

Technical Field

The present disclosure relates to a control device of an internal-combustion engine which controls an EGR amount recirculated from an exhaust passage to an intake passage through an EGR passage.

Description of Related Art

As a conventional control device of an internal-combustion engine for controlling an EGR amount, for example, a device disclosed in Patent Document 1 is known. The internal-combustion engine includes a turbocharger and a so-called low-pressure EGR device which takes an exhaust gas from a downstream side of a turbine of the turbocharger and recirculates the exhaust gas to a downstream side in relation to a compressor of an intake passage. The low-pressure EGR device includes an intake throttle valve which is disposed at an upstream side of the intake passage in relation to a connection portion between the intake passage and an EGR passage in addition to an EGR valve disposed at the EGR passage, and the intake throttle valve is throttled to generate a negative pressure at a downstream side of the EGR valve, so that a differential pressure necessary for recirculating a low-pressure exhaust gas is secured between the upstream and downstream sides of the EGR valve.

Further, the low-pressure EGR device includes a valve interlocking mechanism which is connected to the EGR valve and the intake throttle valve. When the valve interlocking mechanism is driven by an actuator for interlocking the EGR valve and the intake throttle valve with each other, the opening degrees of the EGR valve and the intake throttle valve are respectively controlled to be determined uniquely in response to an operation amount of an actuator. Further, in the control device, a target EGR amount is set in response to a rotation speed and a load of the internal-combustion engine, and a target opening degree of the EGR valve is set based on the target EGR amount and a ratio between detection values of an intake pressure and an exhaust pressure at both end portions of the EGR passage. Then, when the actuator is driven based on the set target opening degree, the EGR valve is controlled such that it has the target opening degree and the intake throttle valve is controlled to have the opening degree corresponding to the opening degree of the EGR valve.

[Patent Document 1] JP 2015-124685 A

In the low-pressure EGR device including the intake throttle valve, when the throttling (negative pressure) of the intake throttle valve is small, the differential pressure between the upstream and downstream sides of the EGR valve is small. Accordingly, a variation in EGR amount becomes larger, and an EGR control relating to the EGR amount or the EGR rate cannot be executed with high accuracy. Meanwhile, when the throttling (negative pressure) of the intake throttle valve is large, the boost work of the turbocharger increases and thus a problem arises in that fuel efficiency is deteriorated. For this reason, it is desirable to control the throttling of the intake throttle valve to be a minimum within a range in which a differential pressure between the upstream and downstream sides of the EGR valve can be secured.

In contrast, in the conventional control device, the target opening degree of the EGR valve is first set based on a detection ratio between the intake pressure and the exhaust pressure at both end portions of the EGR passage and the target EGR amount, and the opening degree of the intake throttle valve is controlled uniformly to follow the opening degree of the EGR valve controlled to the target opening degree. Therefore, the above-described desirable throttling of the intake throttle valve cannot be realized.

The disclosure is contrived to solve the above-described problems and the disclosure provides a control device of an internal-combustion engine capable of reducing a throttling of a throttle valve to a minimum while securing a necessary EGR valve differential pressure. Therefore, accuracy in control of an EGR amount is secured and a problem caused by the throttling of the throttle valve can be prevented as much as possible.

SUMMARY

According to a first aspect of the disclosure, there is provided a control device of an internal-combustion engine for controlling an EGR amount GEGR which is an amount of an exhaust gas recirculated from an exhaust passage 7 to an intake passage 6 through an EGR passage 41, including: an EGR valve 43 which is provided in the EGR passage 41 to adjust the EGR amount GEGR; a throttle valve (an intake throttle valve 25 and an exhaust throttle valve 65 (which are the same in this section) of the embodiment) which is provided at one of an upstream side of the intake passage 6 in relation to a connection portion 6c between the intake passage 6 and the EGR passage 41 and a downstream side of the exhaust passage 7 in relation to a connection portion 7b between the exhaust passage 7 and the EGR passage 41 to adjust a differential pressure $\Delta$PEGR between an upstream pressure and a downstream pressure with respect to the EGR valve 43; a target EGR amount setting unit (an ECU 2, step 4 of FIG. 3) which sets a target EGR amount GEGRCMD which is a target for the EGR amount GEGR; a flow rate parameter acquiring unit (the ECU 2, steps 2 and 4 of FIG. 3) which acquires a flow rate parameter (a target fresh air amount GAIRCMD, a target EGR amount GEGRCMD) representing a flow rate of fresh air and/or an exhaust gas corresponding to a load of the internal-combustion engine 3; an opposite throttle valve side pressure estimation unit (the ECU 2, step 6 of FIG. 3, FIG. 6) which estimates an opposite throttle valve side pressure (an EGR valve upstream pressure PEGR0) which is a pressure at the opposite side to the throttle valve at the upstream and downstream sides of the EGR valve 43 by using the acquired flow rate parameter; a target differential pressure setting unit (the ECU 2, step 5 of FIG. 3, FIG. 4, FIG. 5) which sets a target differential pressure $\Delta$PEGRCMD which is a target of the differential pressure $\Delta$PEGR to a smaller value as a flow rate (a target fresh air amount GAIRCMD) expressed by the flow rate parameter becomes smaller; a target throttle valve side pressure setting unit (the ECU 2, step 7 of FIG. 3) which sets a target throttle valve side pressure (a target valve downstream pressure P1CMD) which is a target of a throttle valve side pressure (a valve downstream pressure P1) corresponding to a pressure on the side of the throttle valve among the upstream and downstream sides of the EGR valve 43 based on the target differential pressure ΔPEGRCMD and the opposite throttle valve side pressure; a target EGR valve opening degree setting unit (the ECU 2, steps 21 to 23 of FIG. 11) which sets a target EGR valve opening degree LEGRCMD which is a target of an opening degree LEGR of the EGR valve 43 by using the target EGR amount GEGRCMD, the opposite throttle valve side pressure, and the target throttle valve side pressure; and an EGR valve control unit (the ECU 2, step 24 of FIG. 11) which controls the EGR valve 43 based on the target EGR valve opening degree LEGRCMD.

DESCRIPTION OF THE EMBODIMENTS

Figure 1:
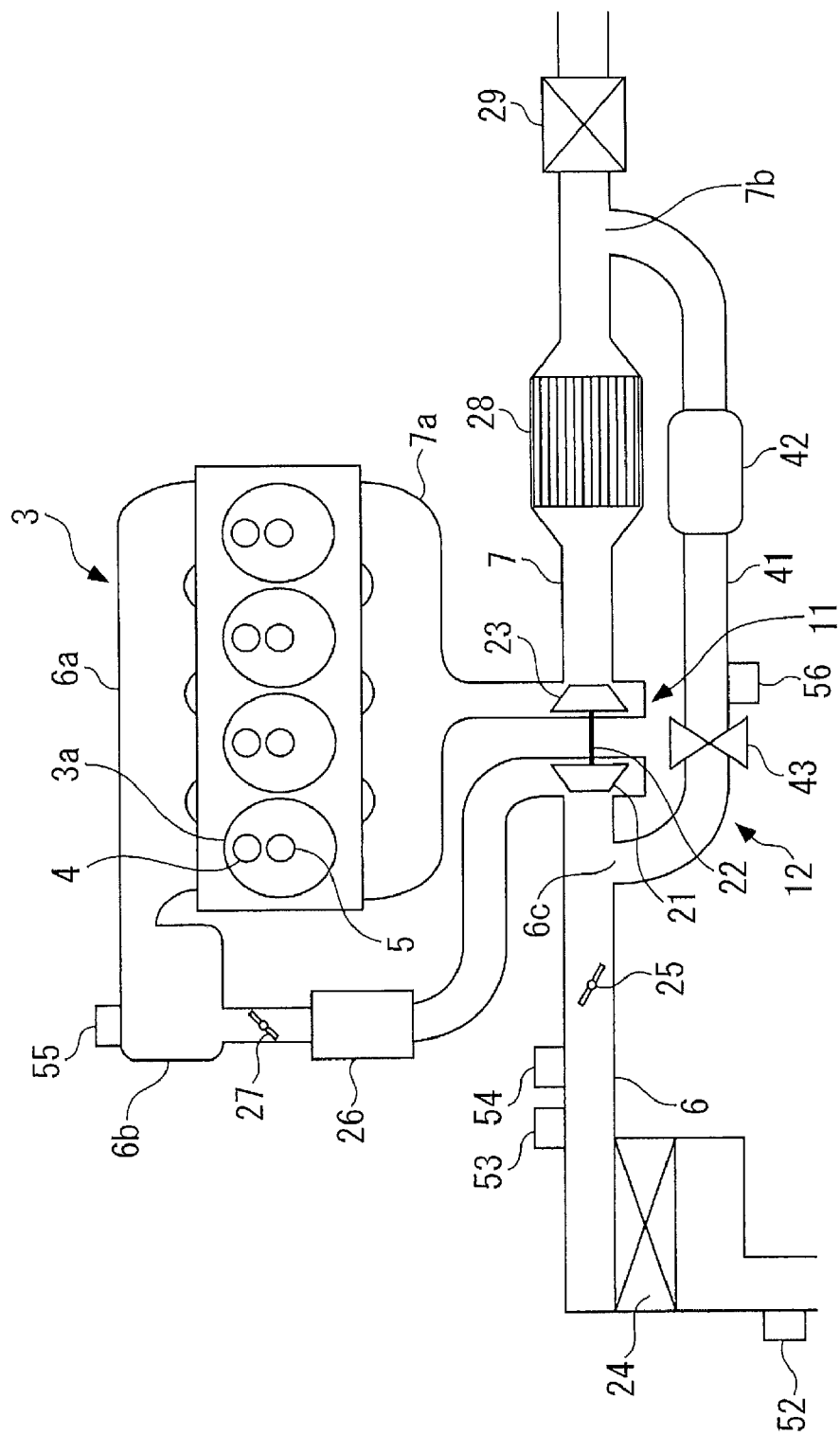
FIG. 1 is a diagram schematically showing an internal-combustion engine which adopts a control device according to a first embodiment of the disclosure.

According to a first aspect of the disclosure, there is provided a control device of an internal-combustion engine for controlling an EGR amount GEGR which is an amount of an exhaust gas recirculated from an exhaust passage 7 to an intake passage 6 through an EGR passage 41, including: an EGR valve 43 which is provided in the EGR passage 41 to adjust the EGR amount GEGR; a throttle valve (an intake throttle valve 25 and an exhaust throttle valve 65 (which are the same in this section) of the embodiment) which is provided at one of an upstream side of the intake passage 6 in relation to a connection portion 6c between the intake passage 6 and the EGR passage 41 and a downstream side of the exhaust passage 7 in relation to a connection portion 7b between the exhaust passage 7 and the EGR passage 41 to adjust a differential pressure ΔPEGR between an upstream pressure and a downstream pressure with respect to the EGR valve 43; a target EGR amount setting unit (an ECU 2, step 4 of FIG. 3) which sets a target EGR amount GEGRCMD which is a target for the EGR amount GEGR; a flow rate parameter acquiring unit (the ECU 2, steps 2 and 4 of FIG. 3) which acquires a flow rate parameter (a target fresh air amount GAIRCMD, a target EGR amount GEGRCMD) representing a flow rate of fresh air and/or an exhaust gas corresponding to a load of the internal-combustion engine 3; an opposite throttle valve side pressure estimation unit (the ECU 2, step 6 of FIG. 3, FIG. 6) which estimates an opposite throttle valve side pressure (an EGR valve upstream pressure PEGR0) which is a pressure at the opposite side to the throttle valve at the upstream and downstream sides of the EGR valve 43 by using the acquired flow rate parameter; a target differential pressure setting unit (the ECU 2, step 5 of FIG. 3, FIG. 4, FIG. 5) which sets a target differential pressure ΔPEGRCMD which is a target of the differential pressure ΔPEGR to a smaller value as a flow rate (a target fresh air amount GAIRCMD) expressed by the flow rate parameter becomes smaller; a target throttle valve side pressure setting unit (the ECU 2, step 7 of FIG. 3) which sets a target throttle valve side pressure (a target valve downstream pressure P1CMD) which is a target of a throttle valve side pressure (a valve downstream pressure P1) corresponding to a pressure on the side of the throttle valve among the upstream and downstream sides of the EGR valve 43 based on the target differential pressure ΔPEGRCMD and the opposite throttle valve side pressure; a target EGR valve opening degree setting unit (the ECU 2, steps 21 to 23 of FIG. 11) which sets a target EGR valve opening degree LEGRCMD which is a target of an opening degree LEGR of the EGR valve 43 by using the target EGR amount GEGRCMD, the opposite throttle valve side pressure, and the target throttle valve side pressure; and an EGR valve control unit (the ECU 2, step 24 of FIG. 11) which controls the EGR valve 43 based on the target EGR valve opening degree LEGRCMD.

The control device of the internal-combustion engine controls the EGR amount recirculated from the exhaust passage to the intake passage through the EGR passage. The EGR passage is provided with an EGR valve. A throttle valve (an intake throttle valve or an exhaust throttle valve) which adjusts a differential pressure (hereinafter, referred to as an "EGR valve differential pressure") between an upstream pressure and a downstream pressure of the EGR valve is provided. The throttle valve is provided at one of the upstream side of the intake passage in relation to the connection portion between the intake passage and the EGR passage and the downstream side of the exhaust passage in relation to the connection portion between the exhaust passage and the EGR passage.

According to the control device, the target EGR amount which is a target of the EGR amount is set. Further, a flow rate parameter representing a flow rate of fresh air and/or an exhaust gas corresponding to a load of the internal-combustion engine is acquired, and an opposite throttle valve side pressure (a pressure at the opposite side to the throttle valve among the upstream and downstream sides of the EGR valve) of the EGR valve is estimated by using the flow rate parameter. From this definition, the opposite throttle valve side pressure corresponds to the upstream pressure of the EGR valve when the throttle valve is the intake throttle valve, and the opposite throttle valve side pressure corresponds to the downstream pressure of the EGR valve when the throttle valve is the exhaust throttle valve.

Further, a target differential pressure which is a target of the EGR valve differential pressure is set as described below, and a target throttle valve side pressure which is a target of the throttle valve side pressure (a pressure on the side of the throttle valve among the upstream and downstream sides of the EGR valve) of the EGR valve is set based on the target differential pressure and the opposite throttle valve side pressure. From this definition, the throttle valve side pressure corresponds to the downstream pressure of the EGR valve when the throttle valve is the intake throttle valve, and the throttle valve side pressure corresponds to the upstream pressure of the EGR valve when the throttle valve is the exhaust throttle valve. Then, a target EGR valve opening degree which is a target of the opening degree of the EGR valve is set by using the target EGR amount, the opposite throttle valve side pressure of the EGR valve, and the target throttle valve side pressure obtained as described above, and the EGR valve is controlled based on the target EGR valve opening degree so that the EGR amount is controlled such that it becomes the target EGR amount.

According to the disclosure, the target differential pressure is set to a smaller value as the flow rate indicated by the flow rate parameter becomes smaller. This is because of the following reason. That is, the EGR valve which is a flow rate adjustment valve has flow rate characteristics in which the EGR amount passing through the EGR valve changes in response to the EGR valve differential pressure and an amount of change of the EGR amount (sensitivity of the EGR amount) with respect to an amount of change of the EGR valve differential pressure becomes larger as the EGR valve differential pressure (the absolute value) becomes smaller. Due to these flow rate characteristics, when there is a variation in EGR valve differential pressure while the EGR valve differential pressure is small, a variation in EGR amount becomes larger. Meanwhile, in the disclosure, since the opposite throttle valve side pressure which is one pressure for determining the EGR valve differential pressure is estimated by using the flow rate parameter corresponding to the load of the internal-combustion engine, a variation in estimated opposite throttle valve side pressure easily occurs when the flow rate indicated by the flow rate parameter becomes larger.

From the above-described relation, since a variation in EGR valve differential pressure due to a variation in estimated opposite throttle valve side pressure increases in a state where the flow rate is relatively large and the EGR valve differential pressure is small, a variation in EGR amount increases. Based on such a viewpoint, according to the disclosure, the target differential pressure is set to a larger value as the flow rate becomes larger, so that a larger EGR valve differential pressure is secured. Accordingly, even when there is a large variation in the estimated opposite throttle valve side pressure and the EGR valve differential pressure, it is possible to secure the control accuracy of the EGR amount by suppressing a variation in EGR amount.

Meanwhile, when the flow rate is relatively small, a variation in estimated opposite throttle valve side pressure is small and thus a variation in EGR valve differential pressure is small. For this reason, a variation in EGR amount is small even when the EGR valve differential pressure is set to be small. Thus, since the target differential pressure is set to a smaller value as the flow rate becomes smaller, it is possible to suppress the throttling of the throttle valve to the minimum while securing the control accuracy of the EGR amount.

As described above, according to the disclosure, since it is possible to suppress the throttling of the throttle valve to the minimum while securing the necessary EGR valve differential pressure, it is possible to secure the control accuracy of the EGR amount and to prevent a problem such as a deterioration in fuel efficiency due to the throttling of the throttle valve as much as possible.

Figure 3:
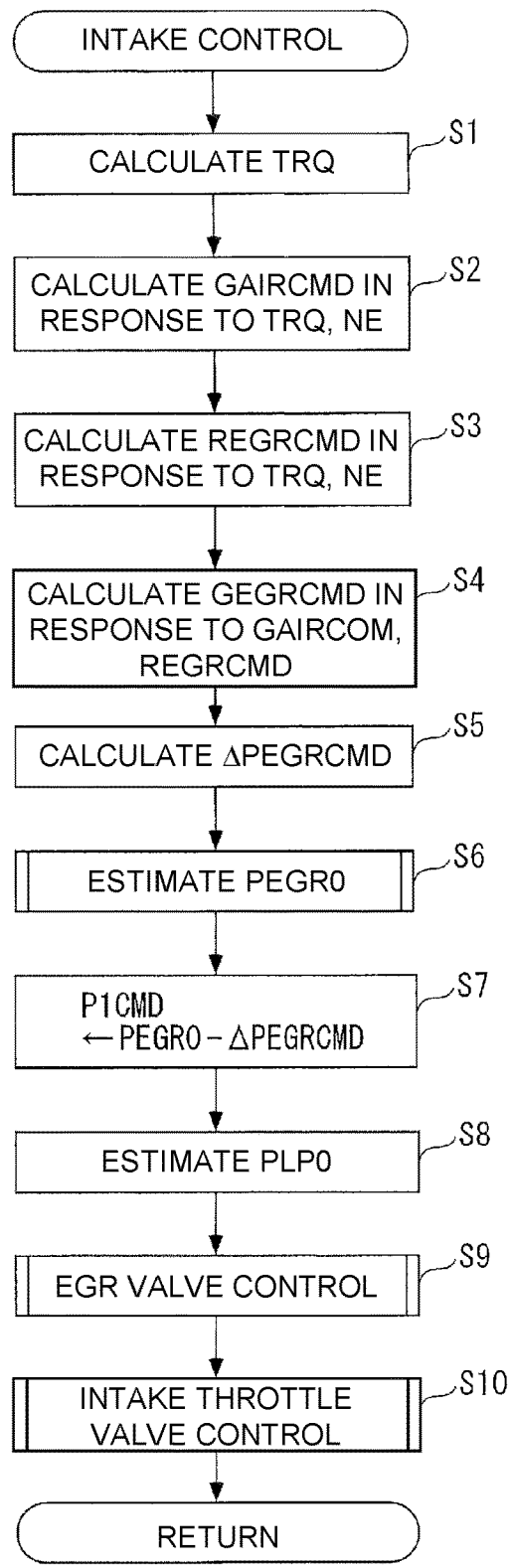
FIG. 3 is a flowchart showing an intake control process according to the first embodiment.
Figure 5:
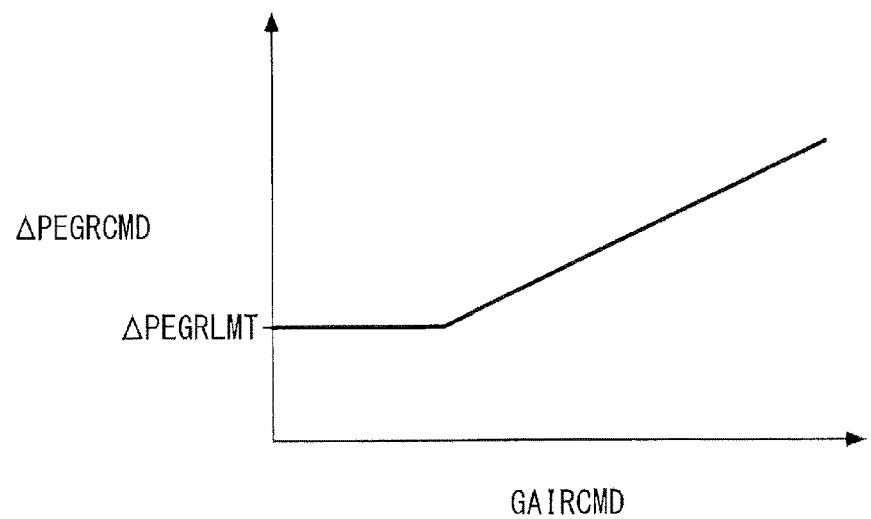
FIG. 5 is a diagram showing a representative relation between a target fresh air amount and a target differential pressure in a target differential pressure map.

According to a second aspect of the disclosure, in the control device of the internal-combustion engine according to the first aspect, the target differential pressure setting unit sets the target differential pressure $\Delta PEGRCMD$ to be not lower than a predetermined lower-limit value $\Delta PEGRLMT$ (step 5 of FIG. 3, FIG. 5).

When the EGR valve differential pressure is too small, a large variation in EGR amount easily occurs and an exhaust pulsation of the exhaust passage easily occurs. Thus, there is a negative influence on the estimation accuracy of the opposite throttle valve side pressure. According to this configuration, since a necessary minimum EGR valve differential pressure is secured by setting the target differential pressure to a predetermined lower-limit value or more, it is possible to suppress an influence of a variation in EGR amount and the exhaust pulsation and to secure more satisfactory accuracy in control of the EGR amount.

According to a third aspect of the disclosure, in the control device of the internal-combustion engine according to the first or second aspect, wherein the throttle valve is the intake throttle valve 25 which is provided at the upstream side of the intake passage 6 in relation to the connection portion 6c between the intake passage 6 and the EGR passage 41 and generates a negative pressure at the downstream side of the EGR valve 43 with the throttling to adjust the differential pressure $\Delta PEGR$, wherein the throttle valve side pressure is the downstream pressure (the valve downstream pressure P1) of the EGR valve 43, wherein the opposite throttle valve side pressure is the upstream pressure (the EGR valve upstream pressure PEGR0) of the EGR valve 43, and wherein the flow rate parameter is the target fresh air amount GAIRCMD which is set as the target value of the fresh air amount GAIR.

According to this configuration, the throttle valve is the intake throttle valve which is disposed at the upstream side of the intake passage in relation to the connection portion between the intake passage and the EGR passage and generates a negative pressure at the downstream side of the EGR valve with the throttling of the intake throttle valve to adjust a differential pressure before and after the EGR valve. In this case, the throttle valve side pressure is the downstream pressure of the EGR valve and the opposite throttle valve side pressure is the upstream pressure of the EGR valve. Further, the target fresh air amount which is set as the target value of the fresh air amount is used as the flow rate parameter representing the load of the internal-combustion engine. The target fresh air amount represents the load of the internal-combustion engine, and from relations in which the sum of the target fresh air amount and the target EGR amount corresponds to the exhaust gas amount discharged from the internal-combustion engine, the target fresh air amount is substantially the same as the amount of the exhaust gas flowing at the downstream side of the exhaust passage in relation to the connection portion between the exhaust passage and the EGR passage. Thus, it is possible to obtain the effects of the first and second aspects when the intake throttle valve is used as the throttle valve.

According to a fourth aspect of the disclosure, in the control device of the internal-combustion engine according to the third aspect, further including: an intake throttle valve upstream pressure estimation unit (the ECU 2, step 8 of FIG. 3) which estimates the upstream pressure (the throttle valve upstream pressure PLP0) of the intake throttle valve 25 by using the target fresh air amount GAIRCMD; a target intake throttle valve opening degree setting unit (the ECU 2, steps 31 to 33 of FIG. 13) which sets the target intake throttle valve opening degree θLPCMD which is a target of the opening degree θLP of the intake throttle valve 25 by using the target fresh air amount GAIRCMD, the upstream pressure of the intake throttle valve, and the downstream pressure of the EGR valve 43; and an intake throttle valve control unit (the ECU 2, step 34 of FIG. 13) which controls the intake throttle valve 25 based on the target intake throttle valve opening degree θLPCMD.

The target fresh air amount corresponds to the amount of the fresh air flowing through the intake passage and passing through the intake throttle valve. According to this configuration, since the upstream pressure of the intake throttle valve is estimated by using the target fresh air amount, the estimation can be executed with high accuracy. Further, since the target intake throttle valve opening degree is set by using the target fresh air amount, the estimated upstream pressure of the intake throttle valve, and the downstream pressure of the EGR valve, that is, the downstream pressure of the intake throttle valve, it is possible to appropriately set the target intake throttle valve opening degree for realizing the target fresh air amount. Thus, since the intake throttle valve is controlled based on the set target intake throttle valve opening degree, the fresh air amount can be controlled with high accuracy such that it becomes the target fresh air amount.

According to a fifth aspect of the disclosure, in the control device of the internal-combustion engine according to the first or second aspect, wherein the throttle valve is the exhaust throttle valve 65 which is provided at the downstream side of the exhaust passage 7 in relation to the connection portion 7b between the exhaust passage 7 and the EGR passage 41 and increases the upstream pressure of the EGR valve 43 by the throttling to adjust the differential pressure ΔPEGR, wherein the throttle valve side pressure is the upstream pressure of the EGR valve 43, wherein the opposite throttle valve side pressure is the downstream pressure of the EGR valve 43, and wherein the flow rate parameter is the target fresh air amount GAIRCMD which is set as the target value of the fresh air amount GAIR.

According to this configuration, the throttle valve is the exhaust throttle valve which is disposed at the downstream side of the exhaust passage in relation to the connection portion between the exhaust passage and the EGR passage and increases the upstream pressure of the EGR valve by the throttling of the exhaust throttle valve to adjust the EGR valve differential pressure. In this case, the throttle valve side pressure is the upstream pressure of the EGR valve and the opposite throttle valve side pressure is the downstream pressure of the EGR valve. Further, the target fresh air amount which is set as the target value of the fresh air amount is used as the flow rate parameter representing the load of the internal-combustion engine. The target fresh air amount represents the load of the internal-combustion engine and corresponds to the amount of the fresh air flowing through the intake passage including the connection portion at the downstream side of the EGR valve. Thus, it is possible to obtain the effects of the first and second aspects when the exhaust throttle valve is used as the throttle valve.

According to a sixth aspect of the disclosure, in the control device of the internal-combustion engine according to the fifth aspect, further including: an exhaust throttle valve downstream pressure estimation unit (the ECU 2, step of FIG. 16) which estimates the downstream pressure of the exhaust throttle valve 65 by using the target fresh air amount GAIRCMD; a target exhaust throttle valve opening degree setting unit (the ECU 2, step of FIG. 16) which sets the target exhaust throttle valve opening degree θEXCMD which is a target of the opening degree θEX of the exhaust throttle valve 65 by using the target fresh air amount GAIRCMD, the downstream pressure of the exhaust throttle valve, and the upstream pressure of the EGR valve 43; and an exhaust throttle valve control unit (the ECU 2, step of FIG. 16) which controls the exhaust throttle valve 65 based on the target exhaust throttle valve opening degree θEXCMD.

As described above, the target fresh air amount corresponds to the amount of the exhaust gas flowing at the downstream side of the exhaust passage in relation to the connection portion between the exhaust passage and the EGR passage. According to this configuration, since the downstream pressure of the exhaust throttle valve is estimated by using the target fresh air amount, the estimation can be executed with high accuracy. Further, since the target exhaust throttle valve opening degree is set by using the target fresh air amount, the estimated downstream pressure of the exhaust throttle valve, and the upstream pressure of the EGR valve, that is, the upstream pressure of the exhaust throttle valve, it is possible to appropriately set the target exhaust throttle valve opening degree for realizing the target fresh air amount. Thus, since the exhaust throttle valve is controlled based on the set target exhaust throttle valve opening degree, the fresh air amount can be controlled such that it becomes the target fresh air amount with high accuracy.

Hereinafter, embodiments of the disclosure will be described in detail with reference to the drawings. As shown in FIG. 1, an internal-combustion engine (hereinafter, referred to as an "engine") 3 according to a first embodiment of the disclosure is, for example, a gasoline engine including four cylinders 3a and is mounted on a vehicle (not shown) as a power source.

Each cylinder 3a of the engine 3 is provided with a fuel injection valve 4 and an spark plug 5 which face a combustion chamber (not shown) of the cylinder 3a. The fuel injection valve 4 directly injects fuel into the combustion chamber and the spark plug 5 ignites an air-fuel mixture formed inside the combustion chamber. A fuel injection amount from the fuel injection valve 4 and an ignition timing of the spark plug 5 are controlled by a control signal from an electronic control unit (hereinafter, referred to as an "ECU") 2 (see FIG. 2). Further, an intake passage 6 is connected to each cylinder 3a through an intake manifold 6a and an intake chamber 6b and an exhaust passage 7 is connected to each cylinder 3a through an exhaust manifold 7a.

The engine 3 includes a turbocharger 11 and an EGR device 12. The turbocharger 11 includes a compressor 21 which is provided in the intake passage 6 and a turbine 23 which is provided in the exhaust passage 7 and is integrally connected to the compressor 21 through a shaft 22. The turbine 23 is driven by an exhaust gas flowing in the exhaust passage 7 and the compressor 21 is rotated together with the turbine so that an intake air is boosted.

The intake passage 6 is provided with an air cleaner 24, an intake throttle valve 25, a compressor 21 of the turbocharger 11, an intercooler 26 for cooling an intake air of which a temperature is increased by a boost operation, and a throttle valve 27 in this order from the upstream side.

The intake throttle valve 25 is configured as a rotatable butterfly valve and is used to generate a negative pressure for assisting the introduction of an EGR gas using the EGR device 12 at the downstream side thereof and to adjust a fresh air amount (an intake air amount) GAIR sucked into the combustion chamber. An opening degree (hereinafter, referred to as an "intake throttle valve opening degree") θLP of the intake throttle valve 25 is controlled in such a manner that an LP actuator 25a (see FIG. 2) connected to the intake throttle valve 25 is driven by a control signal from the ECU 2.

The throttle valve 27 is configured as a rotatable butterfly valve and is disposed at the upstream side of the intake chamber 6b. An opening degree of the throttle valve 27 is controlled in such a manner that a TH actuator 27a (see FIG. 2) connected to the throttle valve 27 is driven by a control signal from the ECU 2, so that an in-cylinder gas amount sucked into the cylinder 3a is controlled.

The exhaust passage 7 is provided with an exhaust gas purifying device 28 which is configured as a three-way catalyst (not shown) for purifying an exhaust gas discharged from the cylinder 3a and a muffler 29 is provided at the downstream side thereof to reduce an exhaust sound.

The EGR device 12 is used to recirculate a part of the exhaust gas discharged from the exhaust passage 7 to the intake passage 6 as an EGR gas and includes an EGR passage 41 and an EGR cooler 42 and an EGR valve 43 provided in the EGR passage 41.

One end portion of the EGR passage 41 is connected to a connection portion 7b located at the downstream side of the exhaust gas purifying device 28 and the turbine 23 of the exhaust passage 7, and the other end portion of the EGR passage 41 is connected to a connection portion 6c between the compressor 21 and the intake throttle valve 25 of the intake passage 6. With this configuration, the EGR gas is taken out in a relatively low-pressure state after the exhaust gas performs work on the turbine 23. That is, the EGR device 12 is configured as a so-called low-pressure EGR device.

The EGR cooler 42 is disposed at the upstream side of the EGR valve 43 and cools a high-temperature EGR gas. The EGR valve 43 is configured as a poppet valve and a lift amount (hereinafter, referred to as an "EGR valve opening degree") LEGR of the EGR valve 43 is controlled in such a manner that an EGR actuator 43a (see FIG. 2) connected to the EGR valve 43 is driven by a control signal from the ECU 2, so that an EGR amount GEGR which is the amount of the EGR gas recirculated to the intake passage 6 is controlled.

Figure 2:
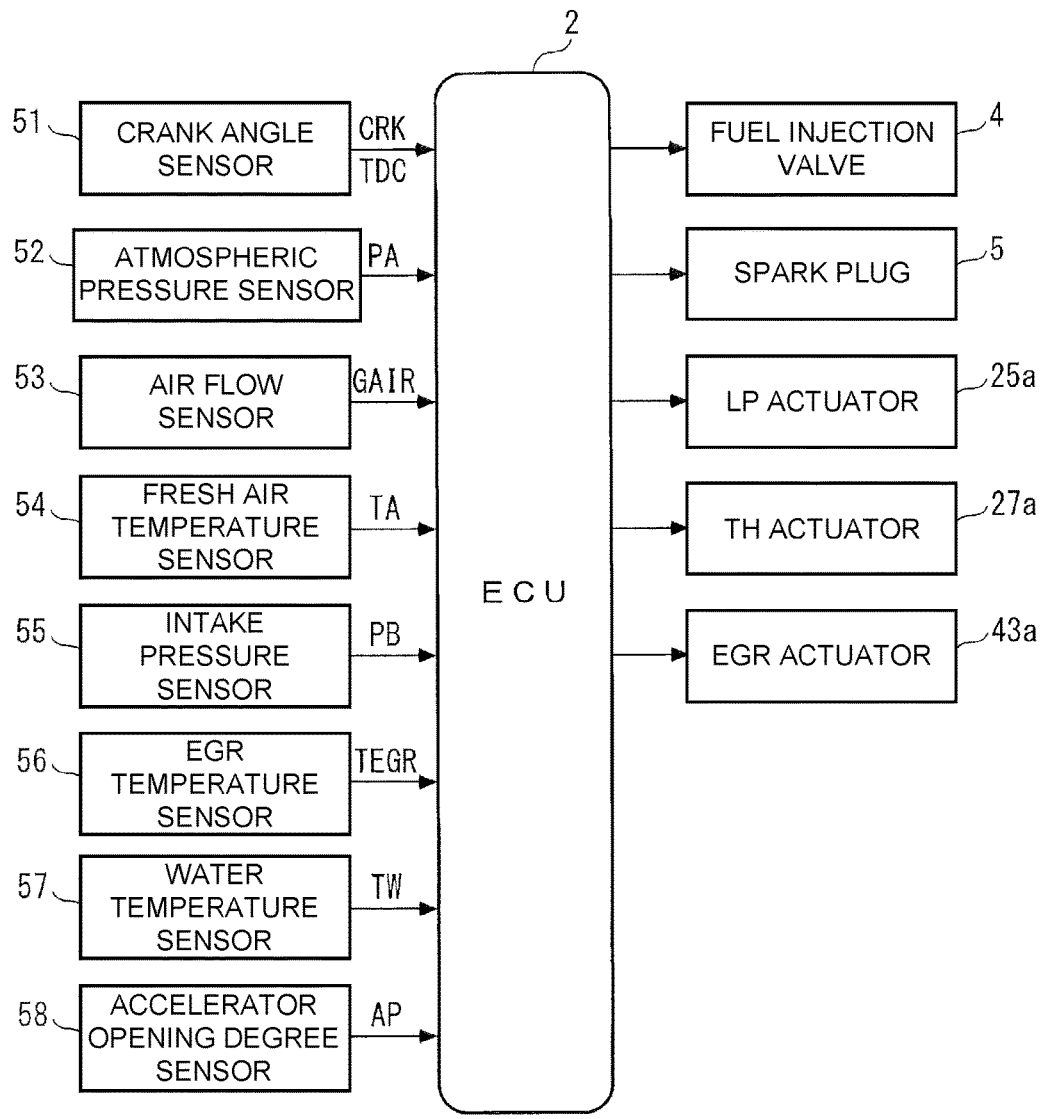
FIG. 2 is a block diagram showing a schematic configuration of the control device.

Further, the engine 3 is provided with various sensors as below in order to detect the operation state and detection signals thereof are input to the ECU 2 (see FIG. 2).

A crank angle sensor 51 outputs a CRK signal and a TDC signal as pulse signals every predetermined crank angle with a rotation of a crank shaft. The CRK signal is output every predetermined crank angle (for example, 0.5°). The ECU 2 calculates a rotation speed (hereinafter, referred to as an "engine rotation speed") NE of the engine 3 based on the CRK signal. The TDC signal is a signal which represents a state where a piston (not shown) of the engine 3 is located at a predetermined crank angle position in the vicinity of an intake TDC (Top Dead Center) in any one of the cylinders 3a and is output every crank angle of 180° when the number of the cylinders 3a is four as in the embodiment.

Further, in the intake passage 6, an atmospheric pressure sensor 52 is provided at the upstream side of the air cleaner 24 and an air flow sensor 53 and a fresh air temperature sensor 54 are provided at the upstream side of the intake throttle valve 25. The atmospheric pressure sensor 52 detects an atmospheric pressure PA. The air flow sensor 53 detects a fresh air amount GAIR passing through the intake throttle valve 25 and sucked into the cylinder 3a, and a fresh air temperature sensor 54 detects a temperature (a fresh air temperature) TA of fresh air passing through the intake throttle valve 25.

The intake pressure sensor 55 is provided in the intake chamber 6b at the downstream side of the throttle valve 27. The intake pressure sensor 55 detects a pressure (an intake pressure) PB of the intake air including the fresh air and the EGR gas sucked into the cylinder 3a as an absolute pressure.

Further, in the EGR passage 41, an EGR temperature sensor 56 is provided at the immediately upstream side of the EGR valve 43. The EGR temperature sensor 56 detects a temperature (hereinafter, referred to as an "EGR temperature") TEGR of the EGR gas cooled by the EGR cooler 42 and passing through the EGR valve 43.

Further, a detection signal representing a temperature (hereinafter, referred to as an "engine water temperature") TW of cooling water for cooling the engine 3 is input to the ECU 2 from a water temperature sensor 57, and a detection signal representing a stepping amount (hereinafter, referred to as an "accelerator opening degree") AP of an accelerator pedal (not shown) of a vehicle is input to the ECU 2 from an accelerator opening degree sensor 58.

The ECU 2 is configured as a microcomputer including a CPU, a RAM, a ROM, and an I/O interface (none is shown). The ECU 2 determines an operation state of the engine 3 in response to the detection signals of various sensors 51 to 58 described above and controls the engine 3 in response to the determination result. In the embodiment, as the engine control, an intake control process is executed in which the EGR valve 43 and the intake throttle valve 25 are controlled and an EGR rate REGR, an EGR amount GEGR, and a fresh air amount GAIR are respectively controlled such that they become their target values.

In the embodiment, the ECU 2 corresponds to a target EGR amount setting unit, a flow rate parameter acquiring unit, an opposite throttle valve side pressure estimation unit, a target differential pressure setting unit, a target throttle valve side pressure setting unit, a target EGR valve opening degree setting unit, an EGR valve control unit, an intake throttle valve upstream pressure estimation unit, a target intake throttle valve opening degree setting unit, an intake throttle valve control unit, an exhaust throttle valve downstream pressure estimation unit, a target exhaust throttle valve opening degree setting unit, and an exhaust throttle valve control unit.

Hereinafter, the intake control process which is executed by the ECU 2 will be described. This process is repeatedly executed at predetermined intervals. FIG. 3 shows a main flow. In this process, first, in step 1 ("S 1" and the same applies to the following description), a request torque TRQ requested from a driver of a vehicle is calculated by searching a predetermined map (not shown) in response to the accelerator opening degree AP and the engine rotation speed NE detected as described above.

Next, a target fresh air amount GAIRCMD which is a target value of the fresh air amount GAIR is calculated by searching a predetermined map (not shown) for a target fresh air amount in response to the request torque TRQ calculated as described above and the engine rotation speed NE (step 2). Further, a target EGR rate REGRCMD which is a target value of the EGR rate REGR is calculated by searching a predetermined map (not shown) for a target EGR rate in response to the request torque TRQ and the engine rotation speed NE (step 3).

Next, a target EGR amount GEGRCMD which is a target value of the EGR amount GEGR is calculated by the following equation (1) using the target fresh air amount GAIRCMD and the target EGR rate REGRCMD calculated as described above (step 4).

$$GEGRCMD = \frac{GAIRCMD \cdot REGRCMD}{1 - REGRCMD} \quad (1)$$

Equation (1) expresses the following equation (2) which is a definition equation of the EGR rate REGR with respect to the EGR amount GEGR and respectively replaces three parameters of Equation (2) with the target values. From Equation (1), when one of the target fresh air amount GAIRCMD, the target EGR rate REGRCMD, and the target EGR amount GEGRCMD is attained, the others are also attained at the same time.

$$REGR = \frac{GEGR}{GAIR + GEGR} \quad (2)$$

(2) Next, a target differential pressure ΔPEGRCMD of the EGR valve 43 is calculated (step 5). The target differential pressure ΔPEGRCMD indicates a target value of a differential pressure (hereinafter, referred to as an "EGR valve differential pressure") ΔPEGR between the upstream pressure and the downstream pressure of the EGR valve 43. Additionally, since the downstream pressure of the EGR valve 43 and the downstream pressure of the intake throttle valve 25 are the same as each other due to the arrangement relation between the EGR valve 43 and the intake throttle valve 25, both pressures will be hereinafter commonly referred to as a "valve downstream pressure P1".

Figure 4:
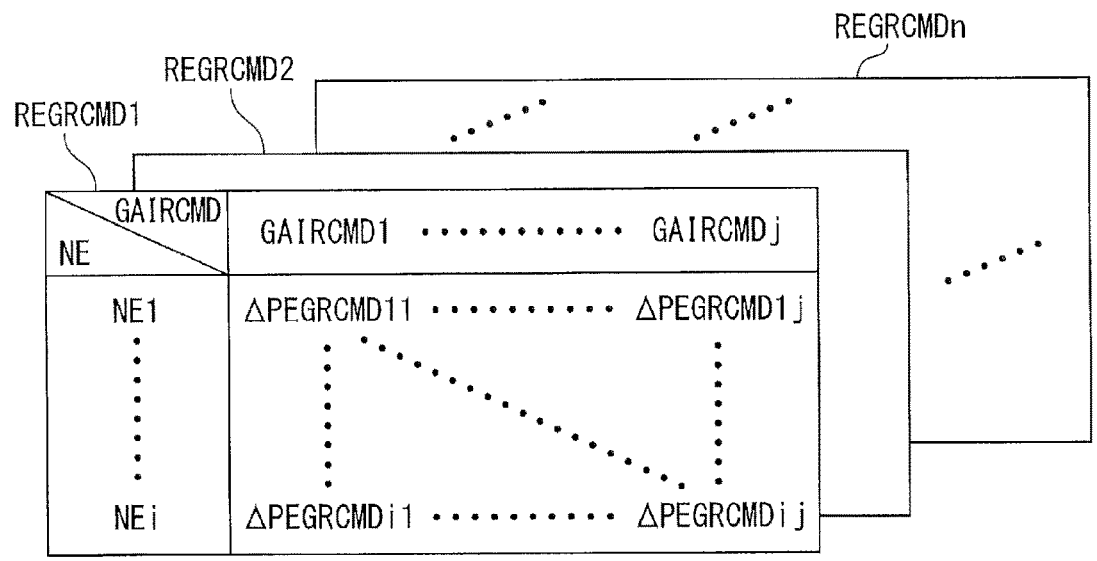
FIG. 4 is a target differential pressure map for setting a target differential pressure.

The calculation of the target differential pressure ΔPEGRCMD is executed by searching a target differential pressure map shown in FIG. 4 in response to the target EGR rate REGRCMD, the target fresh air amount GAIRCMD, and the engine rotation speed NE. The target differential pressure map includes a plurality of maps set for n number of predetermined values REGRCMD1 to REGRCMDn of the target EGR rate. In each map, a minimal differential pressure ΔPEGR capable of stably achieving the target EGR rate REGRCMD is obtained by an experiment or the like in the combination of i number of predetermined values NE1 to NEi of the engine rotation speed and j number of predetermined values GAIRCMD1 to GAIRCMDj of the target fresh air amount and is set as the target differential pressure ΔPEGRCMD.

Further, a relation between the target fresh air amount GAIRCMD and the target differential pressure ΔPEGRCMD set in the target differential pressure map is as below. For example, FIG. 5 shows a table in which a representative relation between the target fresh air amount GAIRCMD and the target differential pressure ΔPEGRCMD is extracted from the target differential pressure map in certain conditions of the target EGR rate REGRCMD and the engine rotation speed NE. As shown in the same drawing, the target differential pressure ΔPEGRCMD is set to a larger value as the target fresh air amount GAIRCMD becomes larger.

As described above, a variation in upstream pressure (hereinafter, referred to as an "EGR valve upstream pressure") PEGR0 of the EGR valve 43 estimated as below becomes larger while a variation in EGR valve differential pressure ΔPEGR becomes larger as the target fresh air amount GAIRCMD becomes larger. Therefore, a larger EGR valve differential pressure ΔPEGR is secured to suppress a variation in EGR amount GEGR and to secure the control accuracy thereof. In contrast, a variation in estimated EGR valve upstream pressure PEGR0 is small when the target fresh air amount GAIRCMD is small. Therefore, a variation in EGR amount GEGR is small even when the EGR valve differential pressure ΔPEGR is small and the control accuracy can be secured.

Further, the target differential pressure ΔPEGRCMD is set not to be smaller than a lower-limit value ΔPEGRLMT (for example, 10 mmHg) in a range in which the target fresh air amount GAIRCMD is small. This is because a variation in EGR amount GEGR becomes larger and the control cannot be executed with high accuracy when the target differential pressure ΔPEGRCMD is too small. Further, when the target differential pressure ΔPEGRCMD is too small, exhaust pulsation in the exhaust passage 7 increases. An influence of the exhaust pulsation may reach the air flow sensor 53 beyond the EGR valve 43 and the intake throttle valve 25. Accordingly, there is concern that the control accuracy may be deteriorated in response to the detection value.

Figure 6:
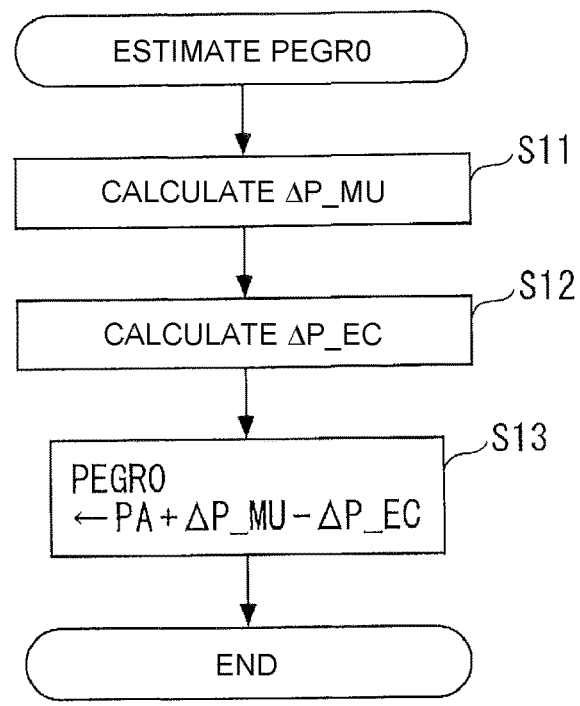
FIG. 6 is a flowchart showing an EGR valve upstream pressure estimation process.

In step 6 of FIG. 3 subsequent to step 5, the EGR valve upstream pressure PEGR0 is estimated by an estimation process shown in FIG. 6. In addition, since the estimation process is basically the same as the detailed description of the application (for example, JP 2013-108449 A) of the applicant, an outline will be described below.

Figure 7:
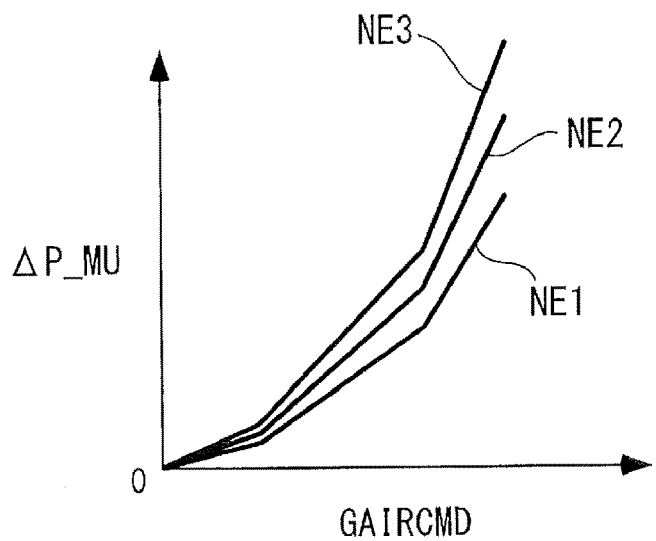
FIG. 7 is a map for calculating a muffler pressure loss.

In this process, first, in step 11, a muffler pressure loss ΔP_MU is calculated. The muffler pressure loss ΔP_MU indicates a pressure loss from a connection portion 7b between the exhaust passage 7 and the EGR passage 41 to a downstream end of the exhaust passage 7 having the atmospheric pressure PA through the downstream muffler 29. The calculation is executed by searching a map shown in FIG. 7 in response to the target fresh air amount GAIRCMD and the engine rotation speed NE.

In this map, the muffler pressure loss ΔP_MU is set to a larger value as the target fresh air amount GAIRCMD becomes larger and the engine rotation speed NE becomes higher in three predetermined values NE1 to NE3 (NE1<NE2<NE3) of the engine rotation speed NE. Additionally, the reason why the target fresh air amount GAIRCMD is used to calculate the muffler pressure loss ΔP_MU in this way is because the target fresh air amount GAIRCMD can be considered to be substantially the same as the amount of the exhaust gas flowing at the downstream side of the EGR passage 41 in relation to the connection portion 7b between the EGR passage 41 and the exhaust passage 7 provided with the muffler 29 from a viewpoint in which the sum of the target fresh air amount GAIRCMD and the target EGR amount GEGRCMD corresponds to the amount of the exhaust gas discharged from the engine 3.

In step 12 of FIG. 6 subsequent to step 11, an EGR pressure loss ΔP_EC is calculated. The EGR pressure loss ΔP_EC indicates a pressure loss from the connection portion 7b between the EGR passage 41 and the exhaust passage 7 to the position immediately upstream of the EGR valve 43 through the EGR cooler 42. The EGR pressure loss ΔP_EC is calculated as below.

First, an EGR temperature (a fresh EGR temperature) TFRSH when the EGR cooler 42 is a new product without any deterioration and an EGR temperature (a deteriorated EGR temperature) TDET when the EGR cooler 42 has completely deteriorated are calculated by searching a predetermined map (not shown) in response to the target EGR amount GEGRCMD and the engine rotation speed NE. Next, a deterioration coefficient K which represents a deterioration degree of the EGR cooler 42 is calculated from relations between a real EGR temperature TEGR detected by the EGR temperature sensor 56, the fresh EGR temperature TFRSH, and the deteriorated EGR temperature TDET.

Figure 8:
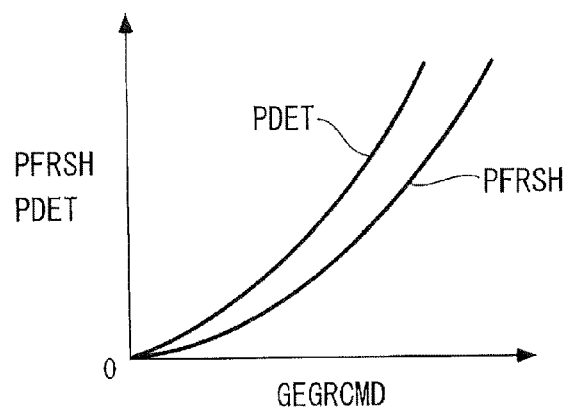
FIG. 8 is a map for calculating a fresh EGR pressure loss and a deteriorated EGR pressure loss used to calculate an EGR pressure loss.

Next, the EGR pressure loss (the fresh EGR pressure loss) PFRSH obtained when the EGR cooler 42 is a new product and the EGR pressure loss (the deteriorated EGR pressure loss) PDET obtained when the EGR cooler 42 has completely deteriorated are calculated by searching a map shown in FIG. 8 in response to the target EGR amount GEGRCMD and the engine rotation speed NE. In this map, the fresh EGR pressure loss PFRSH and the deteriorated EGR pressure loss PDET are all set to larger values as the target EGR amount GEGRCMD becomes larger, and the deteriorated EGR pressure loss PDET is set to be larger than the fresh EGR pressure loss PFRSH. Then, the EGR pressure loss $\Delta P\_EC$ is calculated by the following equation (3) using the deterioration coefficient KCOOLER, the fresh EGR pressure loss PFRSH, and the deteriorated EGR pressure loss PDET calculated as described above.

$$\Delta P\_EC = PFRSH \cdot (1 - KCOOLER) + PDET \cdot KCOOLER \quad (3)$$

As is obvious from Equation (3), the EGRE pressure loss $\Delta P\_EC$ is calculated by executing a weighting calculation with the fresh EGRE pressure loss PFRSH and the deteriorated EGR pressure loss PDET using the deterioration coefficient KCOOLER. Accordingly, the EGRE pressure loss $\Delta P\_EC$ is appropriately calculated as a larger value when the deterioration coefficient KCOOLER becomes larger, that is, the deterioration degree of the EGR cooler 42 becomes higher.

In step 13 of FIG. 6 subsequent to step 12, the EGR valve upstream pressure PEGR0 is calculated by the following equation (4) using the atmospheric pressure PA detected by the atmospheric pressure sensor 52 and the muffler pressure loss $\Delta P\_MU$ and the EGR pressure loss $\Delta P\_EC$ respectively calculated in steps 11 and 12 and the process of FIG. 6 is ended.

$$PEGR0 = PA + \Delta P\_MU - \Delta P\_EC \quad (4)$$

As shown in Equation (4), the EGR valve upstream pressure PEGR0 is calculated by adding the muffler pressure loss $\Delta P\_MU$ to the atmospheric pressure PA corresponding to the pressure at the downstream end of the exhaust passage 7 and subtracting the EGR pressure loss $\Delta P\_EC$ therefrom.

Returning to FIG. 3, in step 7 subsequent to step 6, a target valve downstream pressure P1CMD which is a target value of the valve downstream pressure P1 is calculated by subtracting the target differential pressure $\Delta PEGRCMD$ from the EGR valve upstream pressure PEGR0 using the following equation (5).

$$P1CMD = PEGR0 - \Delta PEGRCMD \quad (5)$$

Figure 9:
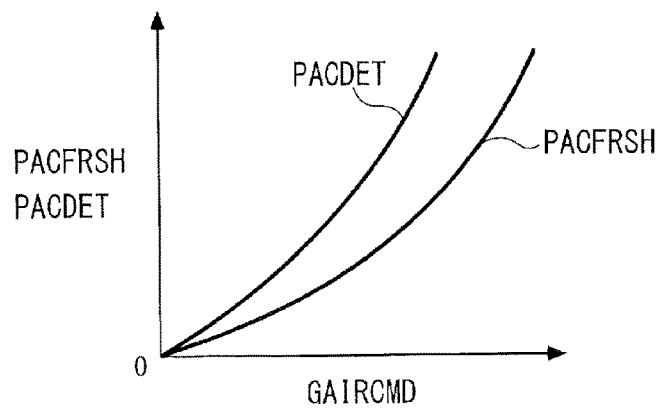
FIG. 9 is a map for calculating a fresh cleaner pressure loss and a deteriorated cleaner pressure loss used to calculate an air cleaner pressure loss.

Next, an upstream pressure (hereinafter, referred to as an "intake throttle valve upstream pressure") PLP0 of the intake throttle valve 25 is estimated (step 8). The estimation is executed, for example, as below. First, a pressure loss (a fresh cleaner pressure loss) PACFRSH obtained when the air cleaner 24 is a new product and a pressure loss (a deteriorated cleaner pressure loss) PACDET obtained when the air cleaner 24 has completely deteriorated are calculated by searching a map shown in FIG. 9 in response to the target fresh air amount GAIRCMD. In this map, the fresh cleaner pressure loss PACFRSH and the deteriorated cleaner pressure loss PACDET are all set to larger values as the target fresh air amount GAIRCMD becomes larger, and the deteriorated cleaner pressure loss PACDET is set to be larger than the fresh cleaner pressure loss PACFRSH.

Further, a deterioration coefficient KCLEANER which represents a real deterioration degree of the air cleaner 24 is calculated based on an appropriate operation parameter, for example, a total traveling distance of the vehicle from the new product state or the replacement state of the air cleaner 24. Then, an air cleaner pressure loss $\Delta P\_AC$ is calculated by the following equation (6) using the deterioration coefficient KCLEANER, the fresh cleaner pressure loss PACFRSH, and the deteriorated cleaner pressure loss PACDET calculated as described above.

$$\Delta P\_AC = PACFRSH \cdot (1 - KCLEANER) + PACDET \cdot KCLEANER \quad (6)$$

As obvious from Equation (6), the air cleaner pressure loss $\Delta P\_AC$ is calculated by executing a weighting calculation for the fresh cleaner pressure loss PACFRSH and the deteriorated cleaner pressure loss PACDET using the deterioration coefficient KCLEANER. Accordingly, the air cleaner pressure loss $\Delta P\_AC$ is appropriately calculated as a larger value as the deterioration coefficient KCLEANER becomes larger, that is, the deterioration degree of the air cleaner 24 becomes higher.

Next, an intake throttle valve upstream pressure PLP0 is calculated by subtracting the air cleaner pressure loss $\Delta P\_AC$ from the atmospheric pressure PA detected by the atmospheric pressure sensor 52 using the following equation (7).

$$PLP0 = PA - \Delta P\_AC \quad (7)$$

In steps 9 and 10 of FIG. 3 subsequent to step 8, a control process of the EGR valve 43 and a control process of the intake throttle valve 25 are respectively executed and the process of FIG. 3 is ended. The control process of the EGR valve 43 is to calculate a target EGR valve opening degree LEGRCMD which is a target value of an EGR valve opening degree LEGR in response to the target EGR amount GEGRCMD, the EGR valve upstream pressure PEGR0, and the target valve downstream pressure P1CMD obtained so far and to control the EGR valve 43 based on the target EGR valve opening degree LEGRCMD. Similarly, the control process of the intake throttle valve 25 is to calculate a target intake throttle valve opening degree $\theta$LPCMD which is a target value of an intake throttle valve opening degree $\theta$LP in response to the target fresh air amount GAIRCMD, the intake throttle valve upstream pressure PLP0, and the target valve downstream pressure P1CMD and to control the intake throttle valve 25 based on the target intake throttle valve opening degree $\theta$LPCMD.

Hereinafter, a nozzle equation which is used in the control processes of the EGR valve 43 and the intake throttle valve 25 will be first described. The nozzle equation is obtained by modeling a relation between a flow rate of a fluid passing through the nozzle and upstream and downstream pressures of the nozzle by considering the fluid passing through the nozzle as a compressible fluid, and the general equation is expressed by the following equation (8).

$$G = K \cdot P0 \cdot \sqrt{\frac{1}{R \cdot T}} \cdot \psi \quad (8)$$

Here, G on the left side indicates a flow rate of the fluid passing through the nozzle. K on the right side indicates an opening degree function determined in response to the configuration and the opening degree of the nozzle, P0 indicates an upstream pressure of the nozzle, R indicates a gas constant of the fluid, and T indicates a temperature of the fluid. Further, ψ indicates a pressure function defined by the following equation (9).

$$\text{when } \frac{P1}{P0} > \left(\frac{2}{\kappa+1}\right)^{\frac{\kappa}{\kappa-1}}, \text{ and then} \quad (9)$$

$$\psi = \sqrt{\frac{2\kappa}{\kappa-1}\left\{\left(\frac{P1}{P0}\right)^{\frac{2}{\kappa}} - \left(\frac{P1}{P0}\right)^{\frac{\kappa+1}{\kappa}}\right\}}$$

$$\text{when } \frac{P1}{P0} \leq \left(\frac{2}{\kappa+1}\right)^{\frac{\kappa}{\kappa-1}}, \text{ and then}$$

$$\psi = \sqrt{\kappa\left(\frac{2}{\kappa+1}\right)^{\frac{\kappa+1}{\kappa-1}}}$$

Figure 10:
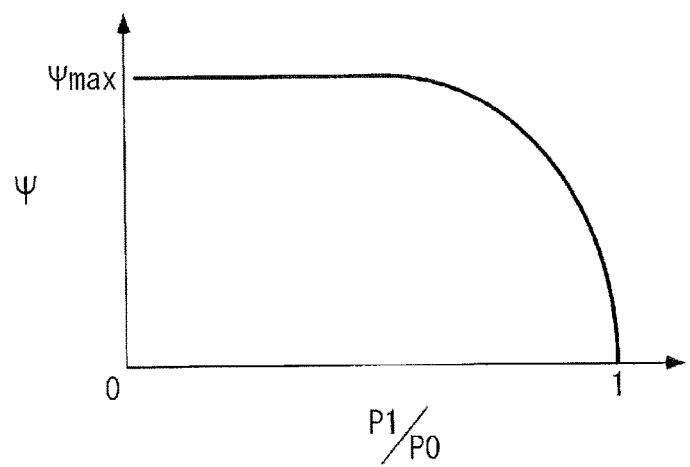
FIG. 10 is a diagram showing a pressure function.

Here, P1 indicates a downstream pressure of the nozzle and κ indicates a specific heat ratio of the fluid. The pressure function ψ is determined in accordance with the pressure ratio P1/P0 between the downstream pressure P1 and the upstream pressure P0 regardless of the configuration or the opening degree of the nozzle and takes a constant maximum value ψmax when the pressure ratio P1/P0 is equal to or smaller than a predetermined value corresponding to a sonic speed. The relation is illustrated in FIG. 10 in which the pressure function ψ is expressed with respect to the pressure ratio P1/P0.

Further, when Equation (8) is expressed with respect to the opening degree function K, the following equation (10) can be obtained.

$$K = \frac{G\sqrt{R \cdot T}}{P0 \cdot \psi} \quad (10)$$

When the above-described nozzle equation is applied to the EGR valve 43, in Equations (8) to (10), the fluid flow rate G is replaced by the target EGR amount GEGRCMD, the opening degree function K is replaced by the opening degree function KEGR of the EGR valve 43, the upstream pressure P0 is replaced by the EGR valve upstream pressure PEGR0 estimated in step 6 of FIG. 3, the downstream pressure P1 is replaced by the target valve downstream pressure P1CMD set in step 7 of FIG. 3, the fluid temperature T is replaced by the EGR temperature TEGR detected by the EGR temperature sensor 56, and the pressure function ψ is replaced by the pressure function EGR for the EGR valve 43. Accordingly, Equations (8) to (10) can be respectively replaced by the following equations (11) to (13).

$$GEGRCMD = KEGR \cdot PEGR0 \cdot \sqrt{\frac{1}{R \cdot TEGR}} \cdot \psi EGR \quad (11)$$

$$\text{when } \frac{P1CMD}{PEGR0} > \left(\frac{2}{\kappa+1}\right)^{\frac{\kappa}{\kappa-1}}, \text{ and then} \quad (12)$$

$$\psi EGR = \sqrt{\frac{2\kappa}{\kappa-1}\left\{\left(\frac{P1CMD}{PEGR0}\right)^{\frac{2}{\kappa}} - \left(\frac{P1CMD}{PEGR0}\right)^{\frac{\kappa+1}{\kappa}}\right\}}$$

$$\text{when } \frac{P1CMD}{PEGR0} \leq \left(\frac{2}{\kappa+1}\right)^{\frac{\kappa}{\kappa-1}}, \text{ and then}$$

$$\psi EGR = \sqrt{\kappa\left(\frac{2}{\kappa+1}\right)^{\frac{\kappa+1}{\kappa-1}}}$$

$$KEGR = \frac{GEGRCMD \cdot \sqrt{R \cdot TEGR}}{PEGR0 \cdot \psi EGR} \quad (13)$$

Further, when the nozzle equation is applied to the intake throttle valve 25, in Equations (8) to (10), the fluid flow rate G is replaced by the target fresh air amount GAIRCMD, the opening degree function K is replaced by the opening degree function KLP of the intake throttle valve 25, the upstream pressure P0 is replaced by the intake throttle valve upstream pressure PLP0 estimated in step 8 of FIG. 3, the downstream pressure P1 is replaced by the target valve downstream pressure P1CMD, the fluid temperature T is replaced by the intake air temperature TA detected by the intake air temperature sensor 54, and the pressure function ψ is replaced by the pressure function ψLP for the intake throttle valve 25. Accordingly, Equations (8) to (10) can be respectively replaced by the following equations (14) to (16).

$$GAIRCMD = KLP \cdot PLP0 \cdot \sqrt{\frac{1}{R \cdot TA}} \cdot \psi LP \quad (14)$$

$$\text{when } \frac{P1CMD}{PLP0} > \left(\frac{2}{\kappa+1}\right)^{\frac{\kappa}{\kappa-1}}, \text{ and then} \quad (15)$$

$$\psi LP = \sqrt{\frac{2\kappa}{\kappa-1}\left\{\left(\frac{P1CMD}{PLP0}\right)^{\frac{2}{\kappa}} - \left(\frac{P1CMD}{PLP0}\right)^{\frac{\kappa+1}{\kappa}}\right\}}$$

$$\text{when } \frac{P1CMD}{PLP0} \leq \left(\frac{2}{\kappa+1}\right)^{\frac{\kappa}{\kappa-1}}, \text{ and then}$$

$$\psi LP = \sqrt{\kappa\left(\frac{2}{\kappa+1}\right)^{\frac{\kappa+1}{\kappa-1}}}$$

$$KLP = \frac{GAIRCMD \cdot \sqrt{R \cdot TA}}{PLP0 \cdot \psi LP} \quad (16)$$

Figure 11:
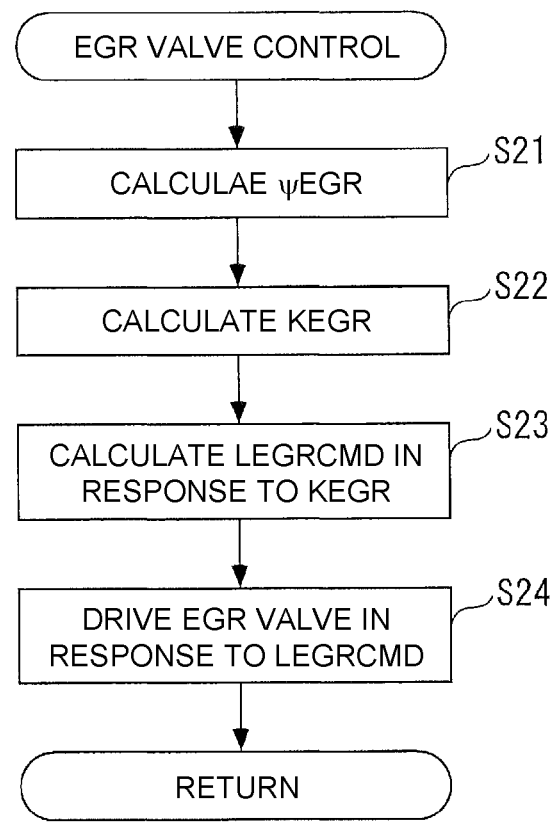
FIG. 11 is a flowchart showing a control process of an EGR valve.

Next, the control process of the EGR valve 43 executed in step 9 of FIG. 3 using the nozzle equation will be described with reference to FIG. 11. In this process, first, in step 21, the pressure function ψEGR for the EGR valve 43 is calculated by the above-described equation (12) in response to the EGR valve upstream pressure PEGR0 and the target valve downstream pressure P1CMD. Next, the opening degree function KEGR of the EGR valve 43 is calculated by Equation (13) using the calculated pressure function ψEGR (step 22).

Figure 12:
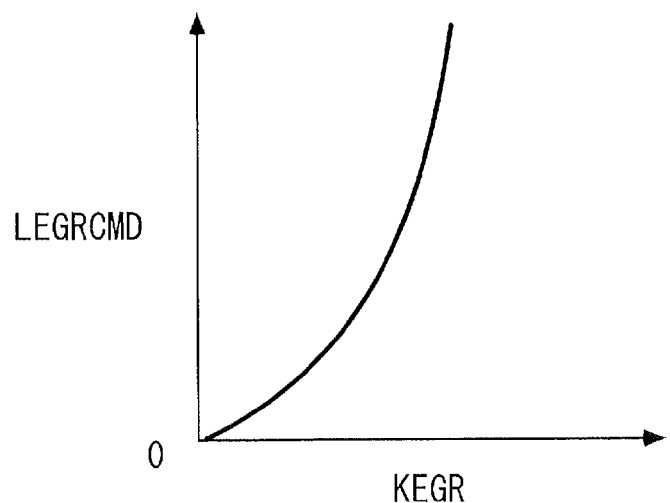
FIG. 12 is a map for calculating a target opening degree of the EGR valve.

Next, the target EGR valve opening degree LEGRCMD is calculated by searching a map shown in FIG. 12 in response to the opening degree function KEGR (step 23). This map is obtained by obtaining a relation between the opening degree function KEGR and the EGR valve opening degree LEGR by an experiment or the like and mapping it to obtain a relationship between the opening degree function KEGR and the target EGR valve opening degree LEGRCMD. Further, the target EGR valve opening degree LEGRCMD is set to a larger value as the opening degree function KEGR becomes larger.

Next, the EGR valve 43 is driven by outputting a drive signal in response to the calculated target EGR valve opening degree LEGRCMD to the EGR actuator 43a (step 24) and this process is ended. Accordingly, since the EGR valve opening degree LEGR is controlled such that it becomes the target EGR valve opening degree LEGRCMD, the EGR amount GEGR is controlled such that it becomes the target EGR amount GEGRCMD, and the EGR rate REGR is controlled such that it becomes the target EGR rate REGRCMD.

Figure 13:
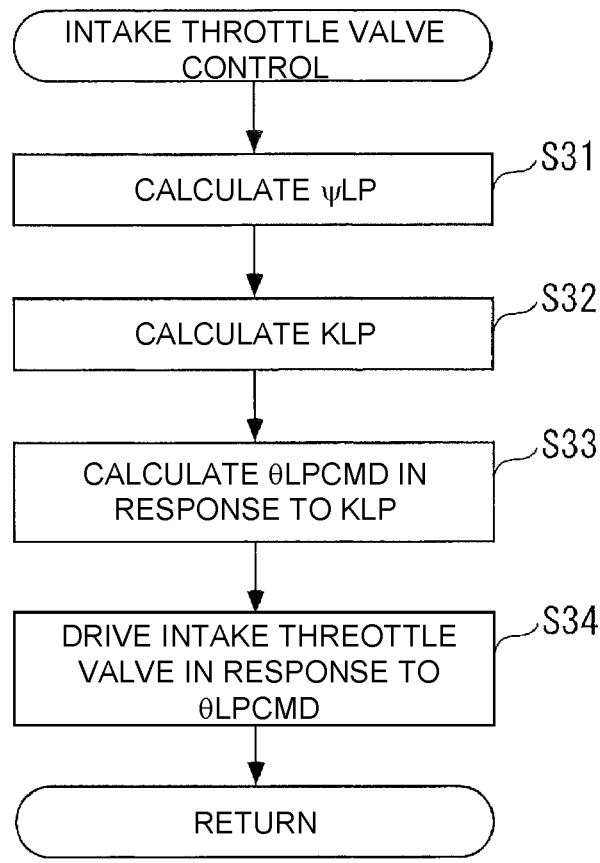
FIG. 13 is a flowchart showing a control process of an intake throttle valve.

Next, the control process of the intake throttle valve 25 executed in step 10 of FIG. 3 will be described with reference to FIG. 13. In this process, first, in step 31, the pressure function $\psi LP$ for the intake throttle valve 25 is calculated by the above-described equation (15) in response to the intake throttle valve upstream pressure PLP0 and the target valve downstream pressure P1CMD. Next, the opening degree function KLP of the intake throttle valve 25 is calculated by Equation (16) using the calculated pressure function $\psi LP$ (step 32).

Figure 14:
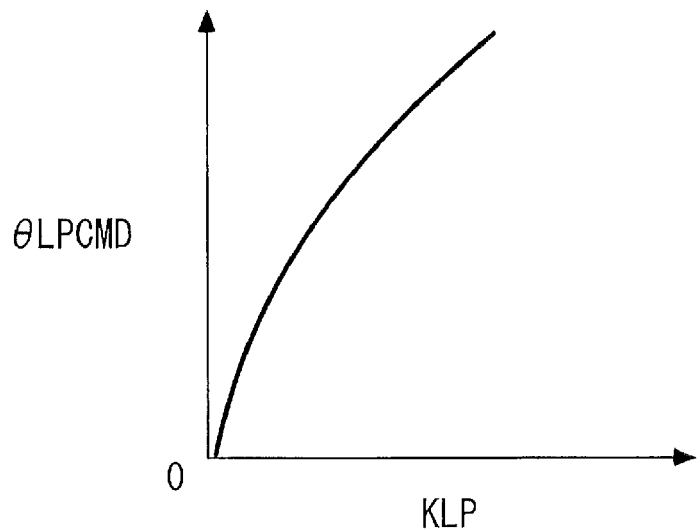
FIG. 14 is a map for calculating a target opening degree of the intake throttle valve.

Next, the target intake throttle valve opening degree $\theta$LPCMD is calculated by searching a map shown in FIG. 14 in response to the opening degree function KLP (step 33). This map is obtained by obtaining a relation between the opening degree function KLP and the intake throttle valve opening degree $\theta$LP by an experiment or the like and mapping it to obtain a relation between the opening degree function KLP and the target intake throttle valve opening degree $\theta$LPCMD. Further, the target intake throttle valve opening degree $\theta$LPCMD is set to a larger value as the opening degree function KLP becomes larger. Further, the shape of the map of FIG. 14 is different from the map for the EGR valve 43 of FIG. 12 due to a difference in type of the valve in that the EGR valve 43 is the poppet valve and the intake throttle valve 25 is the butterfly valve.

Next, the intake throttle valve 25 is driven by outputting a drive signal in response to the calculated target intake throttle valve opening degree $\theta$LPCMD to the LP actuator 25a (step 34) and this process is ended. Accordingly, the intake throttle valve opening degree $\theta$LP is controlled such that it becomes the target intake throttle valve opening degree $\theta$LPCMD and the fresh air amount GAIR is controlled such that it becomes the target fresh air amount GAIRCMD.

As described above, according to the embodiment, the EGR device 12 is configured as the low-pressure EGR device, the intake throttle valve 25 serving as the throttle valve for adjusting the EGR valve differential pressure $\Delta$PEGR is provided at the upstream side of the intake passage 6 in relation to the connection portion 6c between the intake passage 6 and the EGR passage 41, and the target fresh air amount GAIRCMD, the target EGR rate REGRCMD, and the target EGR amount GEGRCMD are set in response to the request torque TRQ and the engine rotation speed NE (steps 2 to 4 of FIG. 3).

Further, the target differential pressure $\Delta$PEGRCMD which is a target of the EGR valve differential pressure $\Delta$PEGR is set (step 5), the EGR valve upstream pressure PEGR0 is estimated by using the target fresh air amount GAIRCMD and the target EGR amount GEGRCMD based on the atmospheric pressure PA detected by the atmospheric pressure sensor 52 (step 6), and a difference between the EGR valve upstream pressure PEGR0 and the target differential pressure $\Delta$PEGRCMD is set as the target valve downstream pressure P1CMD which is a target of the common valve downstream pressure P1 at the downstream side of the intake throttle valve 25 and the downstream side of the EGR valve 43 (step 7).

Then, the target EGR valve opening degree LEGRCMD is set in accordance with the nozzle equation (Equations (11) to (13)) using the target EGR amount GEGRCMD, the EGR valve upstream pressure PEGR0, and the target valve downstream pressure P1CMD obtained as described above (steps 21 to 23 of FIG. 11), and the EGR valve 43 is driven in response to the target EGR valve opening degree LEGRCMD (step 24) so that the EGR amount GEGR is controlled such that it becomes the target EGR amount GEGRCMD.

As shown in FIG. 5, the target differential pressure $\Delta$PEGRCMD is set to a smaller value as the target fresh air amount GAIRCMD becomes smaller. For example, when it is assumed that a variation in EGR valve upstream pressure PEGR0 estimated by using the target fresh air amount GAIRCMD is large since the target fresh air amount GAIRCMD is large, the target differential pressure $\Delta$PEGRCMD is set to a larger value and thus a large EGR valve differential pressure $\Delta$PEGR is secured. Accordingly, since the pressure function $\psi$EGR for the nozzle type EGR valve 43 can be calculated with high accuracy in a state where an influence of a variation in EGR valve differential pressure $\Delta$PEGR is small in a range (a left range of FIG. 10) in which a change amount (sensitivity) for the EGR valve differential pressure $\Delta$PEGR is smaller and the accuracy of the target EGR valve opening degree LEGRCMD set in response to the pressure function $\psi$EGR can be improved, the control accuracy of the EGR amount GEGR can be secured.

Meanwhile, when the target fresh air amount GAIRCMD is small, it is assumed that an influence on the calculation accuracy of the pressure function $\psi$EGR is small since a variation in EGR valve upstream pressure PEGR0 and a variation in EGR valve differential pressure $\Delta$PEGR to be estimated are small. Thus, it is possible to suppress the throttling of the intake throttle valve 25 to the minimum while securing the control accuracy of the EGR amount GEGR by setting the target differential pressure $\Delta$PEGRCMD to a smaller value and to prevent a problem such as a deterioration in fuel efficiency as much as possible.

Further, the target differential pressure $\Delta$PEGRCMD is set to the predetermined lower-limit value $\Delta$PEGRLMT or more. Accordingly, since a necessary minimum EGR valve differential pressure $\Delta$PEGR is secured, a variation in EGR amount GEGR is suppressed. Further, since the exhaust pulsation of the exhaust passage 7 is suppressed and a deterioration in estimation accuracy of the EGR valve upstream pressure PEGR0 due to the influence of the exhaust pulsation can be avoided, it is possible to more satisfactorily secure the control accuracy of the EGR amount GEGR. Furthermore, since it is possible to prevent a problem in which an influence of the exhaust pulsation reaches the air flow sensor 53 beyond the EGR valve 43 and the intake throttle valve 25, it is possible to avoid a deterioration in control accuracy in response to the detection value of the air flow sensor 53.

Further, according to the embodiment, the intake throttle valve upstream pressure PLP0 is estimated by using the target fresh air amount GAIRCMD based on the atmospheric pressure PA (step 8 of FIG. 3). Then, the target intake throttle valve opening degree $\theta$LPCMD is set according to the nozzle equation (Equations (14) to (16)) using the target fresh air amount GAIRCMD, the intake throttle valve upstream pressure PLP0, and the target valve downstream pressure P1CMD (steps 31 to 33 of FIG. 13) and the intake throttle valve 25 is driven in response to the target intake throttle valve opening degree θLPCMD (step 34), so that the fresh air amount GAIR is controlled to become the target fresh air amount GAIRCMD.

In this case, according to the above-described setting, the target differential pressure ΔPEGRCMD is set to a larger value when it is assumed that a variation in differential pressure at the upstream and downstream sides of the intake throttle valve 25 is large since the target fresh air amount GAIRCMD is large, and the target differential pressure ΔPEGRCMD is set to a smaller value when it is assumed that a variation in differential pressure at the upstream and downstream sides of the intake throttle valve 25 is small since the target fresh air amount GAIRCMD is small. Thus, since the pressure function ψLP for the nozzle type intake throttle valve 25 can be calculated with high accuracy while an influence of a variation in differential pressure at the upstream and downstream sides of the intake throttle valve 25 is appropriately compensated, it is possible to improve the accuracy of the target intake throttle valve opening degree θLPCMD set in response to the pressure function ψLP and thus the control accuracy of the fresh air amount GAIR can be secured.

Figure 15:
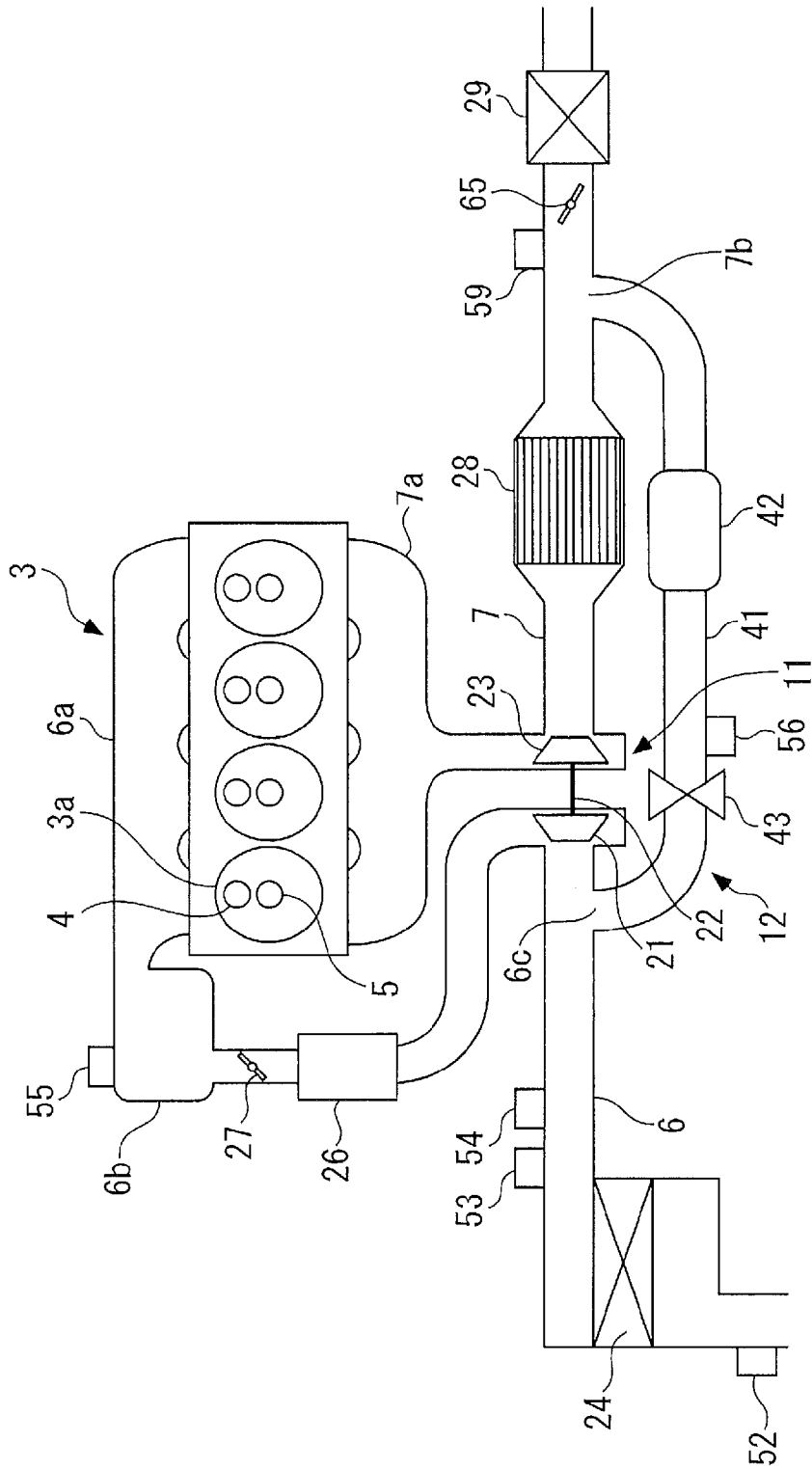
FIG. 15 is a diagram schematically showing an internal-combustion engine which adopts a control device according to a second embodiment of the disclosure.

Next, a second embodiment of the disclosure will be described with reference to FIGS. 15 and 16. As shown in FIG. 15, in the second embodiment, an exhaust throttle valve 65 is provided at the exhaust passage 7 instead of the intake throttle valve 25 of the first embodiment as the throttle valve for adjusting the EGR valve differential pressure ΔPEGR. The exhaust throttle valve 65 is disposed at the downstream side of the exhaust passage 7 in relation to the connection portion 7b between the exhaust passage 7 and the EGR passage 41 and the upstream side of the muffler 29, and the exhaust throttle valve 65 is configured as a rotatable butterfly valve similarly to the intake throttle valve 25.

When the upstream pressure of the exhaust throttle valve 65 and the upstream pressure of the EGR valve 43 communicating with the exhaust throttle valve 65 through the connection portion 7b are increased by the throttling of the exhaust throttle valve 65, a differential pressure is generated with respect to the downstream side of the EGR valve 43, and the upstream EGR valve differential pressure ΔPEGR is adjusted in response to an opening degree (hereinafter, referred to as an "exhaust throttle valve opening degree") θEX of the exhaust throttle valve 65. The exhaust throttle valve opening degree θEX is controlled in such a manner that an EX actuator (not shown) connected to the exhaust throttle valve 65 is driven by a control signal from the ECU 2.

Further, an exhaust gas temperature sensor 59 which detects a temperature (hereinafter, referred to as an "exhaust gas temperature") TEX of the exhaust gas passing through the exhaust throttle valve 65 is provided at the right upstream side of the exhaust throttle valve 65, and the detection signal is input to the ECU 2. The other configurations are the same as those of the first embodiment, and the same reference numerals as those of the first embodiment are given to the common components in FIGS. 15 and 16.

Hereinafter, an intake control process which is executed on the above-described configuration will be described with reference to FIG. 16. The intake control process corresponds to the intake control process of FIG. 3 of the first embodiment and is repeatedly executed at a predetermined cycle by the ECU 2.

In this process, first, steps 1 to 5 are executed by the completely same contents as those of FIG. 3. Specifically, the request torque TRQ is calculated (step 1), the target fresh air amount GAIRCMD and the target EGR rate REGRCMD are respectively calculated in response to the request torque TRQ and the engine rotation speed NE (steps 2 and 3), the target EGR amount GEGRCMD is calculated (step 4), and the target differential pressure ΔPEGRCMD is calculated by searching the target differential pressure map of FIG. 4 in response to the target EGR rate REGRCMD, the target fresh air amount GAIRCMD, and the engine rotation speed NE (step 5).

In next step 46, the EGR valve downstream pressure PEGR1 which is the downstream pressure of the EGR valve 43 is estimated. Since the EGR valve downstream pressure PEGR1 is the same as the pressure in the vicinity of the connection portion 6c of the intake passage 6, the estimation is executed by the completely same method as the estimation of the intake throttle valve upstream pressure PLP0 of the first embodiment. That is, the air cleaner pressure loss ΔP_AC is calculated in response to the target fresh air amount GAIRCMD and the deterioration degree of the air cleaner 24, and the EGR valve downstream pressure PEGR1 is calculated by subtracting the calculated air cleaner pressure loss ΔP_AC from the atmospheric pressure PA detected by the atmospheric pressure sensor 52.

Next, in step 47, the target valve upstream pressure P0CMD which is the target value of the valve upstream pressure P0 is calculated by adding the target differential pressure ΔPEGRCMD to the EGR valve downstream pressure PEGR1. The valve upstream pressure P0 commonly shows the upstream pressure of the exhaust throttle valve 65 and the upstream pressure of the EGR valve 43 which are the same as each other.

Next, an exhaust throttle valve downstream pressure PEX1 which is the downstream pressure of the exhaust throttle valve 65 is estimated (step 48). Similarly to the first embodiment, this estimation is executed in such a manner that the muffler pressure loss ΔP_MU is calculated by searching the map shown in FIG. 7 in response to the target fresh air amount GAIRCMD and the engine rotation speed NE and the calculated muffler pressure loss ΔP_MU is added to the atmospheric pressure PA.

Next, the control process of the EGR valve 43 is executed (step 49). In the control process, the nozzle equation is applied to the EGR valve 43. In the nozzle equation, the target EGR amount GEGRCMD, the target valve upstream pressure P0CMD, the EGR valve downstream pressure PEGR1, and the EGR temperature TEGR are respectively used as the fluid flow rate G, the upstream pressure P0, the downstream pressure P1, and the fluid temperature T and the target EGR valve opening degree LEGRCMD is calculated according to the same sequence as that of steps 21 to 23 of the control process of FIG. 11 of the first embodiment. Then, a drive signal in response to the target EGR valve opening degree LEGRCMD is output to the EGR actuator 43a to drive the EGR valve 43. Accordingly, since the EGR valve opening degree LEGR is controlled such that it becomes the target EGR valve opening degree LEGRCMD, the EGR amount GEGR and the EGR rate REGR are respectively controlled such that they become the target EGR amount GEGRCMD and the target EGR rate REGRCMD.

Figure 16:
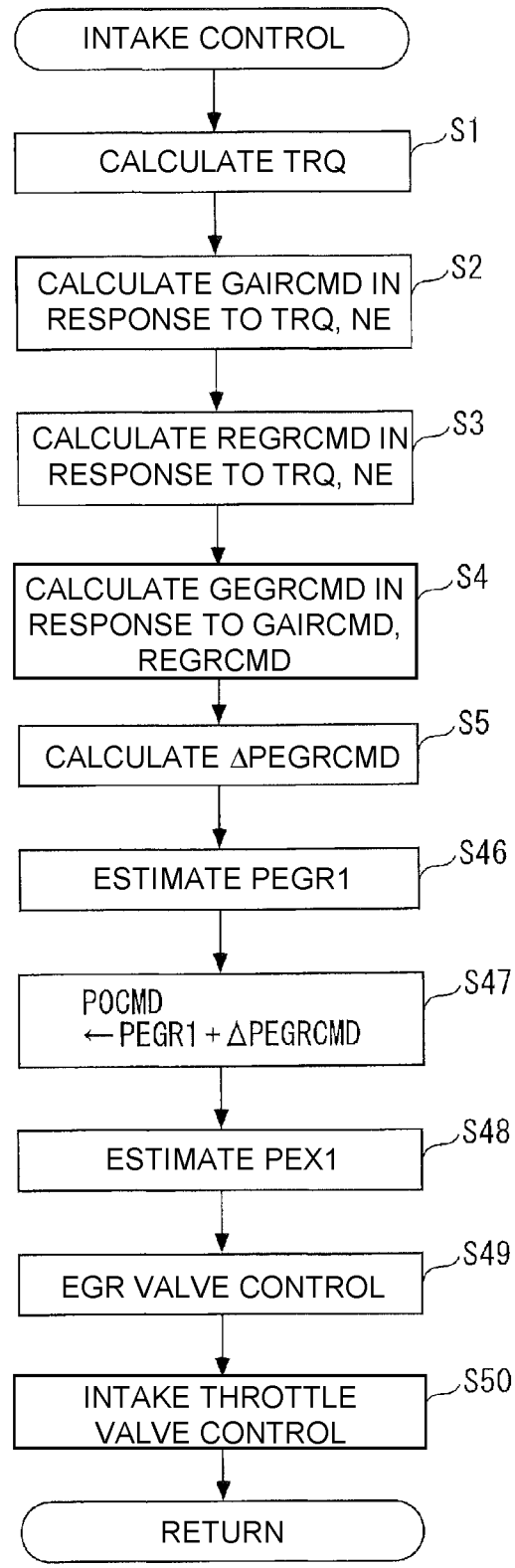
FIG. 16 is a flowchart showing an intake control process of the second embodiment.

Finally, the control process of the exhaust throttle valve 65 is executed (step 50) and the process of FIG. 16 is ended.

In the control process, the nozzle equation is applied to the exhaust throttle valve 65. In the nozzle equation, the target fresh air amount GAIRCMD, the target valve upstream pressure P0CMD, the exhaust throttle valve downstream pressure PEX1, and the exhaust gas temperature TEX detected by the exhaust gas temperature sensor 59 are respectively used as the fluid flow rate G, the upstream pressure P0, the downstream pressure P1, and the fluid temperature T, and the target exhaust throttle valve opening degree θEXCMD is calculated according to the same sequence as that of steps 31 to 33 of the control process of FIG. 13 of the first embodiment. Then, a drive signal in response to the target exhaust throttle valve opening degree θEXCMD is output to the EX actuator to drive the exhaust throttle valve 63. Accordingly, since the exhaust throttle valve opening degree θEX is controlled such that it becomes the target exhaust throttle valve opening degree θEXCMD, the fresh air amount GAIR is controlled such that it becomes the target fresh air amount GAIRCMD.

From a relation in which the sum of the target fresh air amount GAIRCMD and the target EGR amount GEGRCMD corresponds to the exhaust gas amount discharged from the engine 3, the target fresh air amount GAIRCMD is substantially the same as the amount of the exhaust gas flowing toward the downstream side while passing through the exhaust throttle valve 65 from the connection portion 7b between the exhaust passage 7 and the EGR passage 41. Thus, when the exhaust throttle valve opening degree θEX is controlled such that it becomes the target exhaust throttle valve opening degree θEXCMD as described above, the fresh air amount GAIR can be controlled such that it becomes the target fresh air amount GAIRCMD.

In the above-described control of the EGR amount GEGR and the fresh air amount GAIR, the target differential pressure ΔPEGRCMD is set to a smaller value as the target fresh air amount GAIRCMD becomes smaller and is set to a predetermined lower-limit value ΔPEGRLMT or more as in the first embodiment. Thus, also in the embodiment, it is possible to obtain the same effect as the first embodiment capable of preventing a problem such as a deterioration in fuel efficiency as much as possible by suppressing the throttling of the exhaust throttle valve 65 to the minimum while securing the control accuracy of the EGR amount GEGR and the fresh air amount GAIR.

In addition, the disclosure is not limited to the above-described embodiment and can be modified into various forms. For example, in the embodiment, the nozzle equation is used at the time of setting the target EGR valve opening degree LEGRCMD, the target intake throttle valve opening degree θLPCMD, and the target exhaust throttle valve opening degree θEXCMD, but the disclosure can be also applied to a case where such setting is executed by other methods. This is because the above-described characteristic in which a change amount (sensitivity) of the flow rate with respect to a change amount of the differential pressure at the upstream and downstream sides becomes larger as the differential pressure (the absolute value) at the upstream and downstream sides becomes smaller is not related to the flow rate calculation method but is a flow rate characteristic of the valve through which the fluid passes. Thus, it is possible to obtain the same effect by applying the disclosure even when a method other than the nozzle equation is used.

Further, the EGR device of the embodiment is configured as a so-called low-pressure EGR device, but the disclosure can be also applied to a case where the EGR device is a so-called high-pressure EGR device. Further, the EGR temperature TEGR is detected by the EGR temperature sensor 56 in the first and second embodiments, and the exhaust gas temperature TEX is detected by the exhaust gas temperature sensor 59 in the second embodiment. However, these temperatures may be obtained by an appropriate estimation method.

Further, the embodiment is an example in which the disclosure is applied to the vehicle engine, but the disclosure is not limited thereto. For example, the disclosure can be also applied to an engine other than the vehicle engine, for example, an engine for a ship propulsion device such as an outboard motor in which a crank shaft is disposed vertically. In addition, detailed configurations can be appropriately modified without departing from the spirit of the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device of an internal-combustion engine for controlling an EGR amount which is an amount of an exhaust gas recirculated from an exhaust passage to an intake passage through an EGR passage, comprising:
   an EGR valve which is provided in the EGR passage to adjust the EGR amount;
   a throttle valve which is provided at one of an upstream side of the intake passage in relation to a connection portion between the intake passage and the EGR passage and a downstream side of the exhaust passage in relation to a connection portion between the exhaust passage and the EGR passage to adjust a differential pressure between an upstream pressure and a downstream pressure of the EGR valve;
   a target EGR amount setting unit which sets a target EGR amount which is a target of the EGR amount;
   a flow rate parameter acquiring unit which acquires a flow rate parameter representing a flow rate of fresh air and/or an exhaust gas corresponding to a load of the internal-combustion engine;
   an opposite throttle valve side pressure estimation unit which estimates an opposite throttle valve side pressure which is a pressure at the opposite side to the throttle valve among an upstream side and a downstream side of the EGR valve using the acquired flow rate parameter;
   a target differential pressure setting unit which sets a target differential pressure which is a target of the differential pressure to a smaller value as the flow rate indicated by the flow rate parameter becomes smaller;
   a target throttle valve side pressure setting unit which sets a target throttle valve side pressure which is a target of a throttle valve side pressure on the side of the throttle valve among the upstream side and the downstream side of the EGR valve based on the target differential pressure and the opposite throttle valve side pressure;
   a target EGR valve opening degree setting unit which sets a target EGR valve opening degree which is a target of an opening degree of the EGR valve by using the target EGR amount, the opposite throttle valve side pressure, and the target throttle valve side pressure; and
   an EGR valve control unit which controls the EGR valve based on the target EGR valve opening degree.

2. The control device of the internal-combustion engine according to claim 1, wherein the target differential pressure setting unit sets the target differential pressure so that the target differential pressure is not smaller than a predetermined lower-limit value.

3. The control device of the internal-combustion engine according to claim 2,
wherein the throttle valve is an intake throttle valve which is provided at an upstream side of the intake passage in relation to the connection portion between the intake passage and the EGR passage and generates a negative pressure at the downstream side of the EGR valve by a throttling to adjust the differential pressure,
wherein the throttle valve side pressure is the downstream pressure of the EGR valve,
wherein the opposite throttle valve side pressure is the upstream pressure of the EGR valve, and
wherein the flow rate parameter is a target fresh air amount set as a target value of a fresh air amount.

4. The control device of the internal-combustion engine according to claim 3, further comprising:
an intake throttle valve upstream pressure estimation unit which estimates an upstream pressure of the intake throttle valve by using the target fresh air amount;
a target intake throttle valve opening degree setting unit which sets a target intake throttle valve opening degree which is a target of an opening degree of the intake throttle valve by using the target fresh air amount, the upstream pressure of the intake throttle valve, and the downstream pressure of the EGR valve; and
an intake throttle valve control unit which controls the intake throttle valve based on the target intake throttle valve opening degree.

5. The control device of the internal-combustion engine according to claim 2,
wherein the throttle valve is an exhaust throttle valve which is provided at a downstream side of the exhaust passage in relation to the connection portion between the exhaust passage and the EGR passage and increases the upstream pressure of the EGR valve by a throttling to adjust the differential pressure,
wherein the throttle valve side pressure is the upstream pressure of the EGR valve,
wherein the opposite throttle valve side pressure is the downstream pressure of the EGR valve, and
wherein the flow rate parameter is a target fresh air amount set as a target value of a fresh air amount.

6. The control device of the internal-combustion engine according to claim 5, further comprising:
an exhaust throttle valve downstream pressure estimation unit which estimates a downstream pressure of the exhaust throttle valve by using the target fresh air amount;
a target exhaust throttle valve opening degree setting unit which sets a target exhaust throttle valve opening degree which is a target of an opening degree of the exhaust throttle valve by using the target fresh air amount, the downstream pressure of the exhaust throttle valve, and the upstream pressure of the EGR valve; and
an exhaust throttle valve control unit which controls the exhaust throttle valve based on the target exhaust throttle valve opening degree.

7. The control device of the internal-combustion engine according to claim 1,
wherein the throttle valve is an intake throttle valve which is provided at an upstream side of the intake passage in relation to the connection portion between the intake passage and the EGR passage and generates a negative pressure at the downstream side of the EGR valve by a throttling to adjust the differential pressure,
wherein the throttle valve side pressure is the downstream pressure of the EGR valve,
wherein the opposite throttle valve side pressure is the upstream pressure of the EGR valve, and
wherein the flow rate parameter is a target fresh air amount set as a target value of a fresh air amount.

8. The control device of the internal-combustion engine according to claim 7, further comprising:
an intake throttle valve upstream pressure estimation unit which estimates an upstream pressure of the intake throttle valve by using the target fresh air amount;
a target intake throttle valve opening degree setting unit which sets a target intake throttle valve opening degree which is a target of an opening degree of the intake throttle valve by using the target fresh air amount, the upstream pressure of the intake throttle valve, and the downstream pressure of the EGR valve; and
an intake throttle valve control unit which controls the intake throttle valve based on the target intake throttle valve opening degree.

9. The control device of the internal-combustion engine according to claim 1,
wherein the throttle valve is an exhaust throttle valve which is provided at a downstream side of the exhaust passage in relation to the connection portion between the exhaust passage and the EGR passage and increases the upstream pressure of the EGR valve by a throttling to adjust the differential pressure,
wherein the throttle valve side pressure is the upstream pressure of the EGR valve,
wherein the opposite throttle valve side pressure is the downstream pressure of the EGR valve, and
wherein the flow rate parameter is a target fresh air amount set as a target value of a fresh air amount.

10. The control device of the internal-combustion engine according to claim 9, further comprising:
an exhaust throttle valve downstream pressure estimation unit which estimates a downstream pressure of the exhaust throttle valve by using the target fresh air amount;
a target exhaust throttle valve opening degree setting unit which sets a target exhaust throttle valve opening degree which is a target of an opening degree of the exhaust throttle valve by using the target fresh air amount, the downstream pressure of the exhaust throttle valve, and the upstream pressure of the EGR valve; and
an exhaust throttle valve control unit which controls the exhaust throttle valve based on the target exhaust throttle valve opening degree.

* * * * *